US010708591B2

(12) United States Patent
Zhang et al.

(10) Patent No.: US 10,708,591 B2
(45) Date of Patent: Jul. 7, 2020

(54) ENHANCED DEBLOCKING FILTERING DESIGN IN VIDEO CODING

(71) Applicant: QUALCOMM Incorporated, San Diego, CA (US)

(72) Inventors: Li Zhang, San Diego, CA (US); Yu-Chen Sun, Bellevue, WA (US); Wei-Jung Chien, San Diego, CA (US); Jianle Chen, San Diego, CA (US); Kai Zhang, San Diego, CA (US); Yi-Wen Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 64 days.

(21) Appl. No.: 15/925,310

(22) Filed: Mar. 19, 2018

(65) Prior Publication Data

US 2018/0270480 A1  Sep. 20, 2018

Related U.S. Application Data

(60) Provisional application No. 62/504,824, filed on May 11, 2017, provisional application No. 62/474,013, filed on Mar. 20, 2017.

(51) Int. Cl.
*H04N 19/117* (2014.01)
*H04N 19/107* (2014.01)
(Continued)

(52) U.S. Cl.
CPC ......... *H04N 19/117* (2014.11); *H04N 19/107* (2014.11); *H04N 19/119* (2014.11);
(Continued)

(58) Field of Classification Search
CPC ...... H04N 19/82; H04N 19/117; H04N 19/80; H04N 19/96; H04N 19/176; H04N 19/86;
(Continued)

(56) References Cited

U.S. PATENT DOCUMENTS

2014/0185665 A1\* 7/2014 Pu .................. H04N 19/117
375/240.02

OTHER PUBLICATIONS

Ahn S., et al., "A Novel Fast CU Encoding Scheme Based on Spatiotemporal Encoding Parameters for HEVC Inter Coding", IEEE Transactions on Circuits and Systems for Video Technology, Institute of Electrical and Electronics Engineers, USA, vol. 25, No. 3, Mar. 1, 2015 (Mar. 1, 2015), pp. 422-435, XP011574338, ISSN: 1051-8215, DOI: 10.1109/TCSVT.2014.2360031 [retrieved on Mar. 3, 2015] the whole document.
(Continued)

*Primary Examiner* — Obafemi O Sosanya
(74) *Attorney, Agent, or Firm* — Shumaker & Sieffert, P.A.

(57) ABSTRACT

A video encoder reconstructs pixels of a current block and applies a deblocking filter to the reconstructed pixels of the current block to derive deblocking-filtered reconstructed pixels of the current block. Furthermore, the video encoder calculates distortion values based on values of the deblocking-filtered reconstructed pixels of the current block and original pixels of the current block. The video encoder selects, based on the calculated distortion values, an encoding mode for the current block. The encoding mode for the current block is a partitioning mode for the current block or a coding unit mode for the current block.

29 Claims, 16 Drawing Sheets

(51) Int. Cl.
  *H04N 19/176* (2014.01)
  *H04N 19/96* (2014.01)
  *H04N 19/82* (2014.01)
  *H04N 19/86* (2014.01)
  *H04N 19/119* (2014.01)
  *H04N 19/154* (2014.01)
(52) U.S. Cl.
  CPC ......... *H04N 19/154* (2014.11); *H04N 19/176* (2014.11); *H04N 19/82* (2014.11); *H04N 19/86* (2014.11); *H04N 19/96* (2014.11)
(58) Field of Classification Search
  CPC ... H04N 19/119; H04N 19/154; H04N 19/107
  See application file for complete search history.

(56) References Cited

OTHER PUBLICATIONS

Blasi S.G., et al., "Enhanced Inter-Prediction via Shifting Transformation in the H.264/AVC", IEEE Transactions on Circuits and Systems for Video Technology, Institute of Electrical and Electronics Engineers, USA, vol. 23, No. 4, Apr. 1, 2013 (Apr. 1, 2013), pp. 735-740, XP011499096, ISSN: 1051-8215, DOI: 10.1109/TCSVT.2012.2214931 the whole document.

International Search Report and Written Opinion—PCT/US2018/023319—ISA/EPO—dated Jun. 25, 2018.

Pu W., et al., "High Frequency SAO for Scalable Extension of HEVC", 2013 Picture Coding Symposium (PCS), Dec. 1, 2013 (Dec. 1, 2013), pp. 121-124, XP055103512, DOI: 10.1109/PCS.2013.6737698 ISBN: 378-1-47-990292-7 the whole document.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wang et al., "High Efficiency Video Coding (HEVC) Defect Report," Joint Collaborative Team on Video Coding (JCT-of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Chen J., et al., "Algorithm Description of Joint Exploration Test Model 5", Document: JVET-E1001_v2, Joint Video Exploration Team (JVET) of ITU-T SG 16 WP 3 and ISO/IEC JTC 1/SC 29/WG 11, 5th Meeting: Geneva, CH, Jan. 12-20, 2017, 19 Pages.

Yamakage T., et al., "CE12: Deblocking filter parameter adjustment in slice level", Document: JCTVC-G174, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 8 Pages.

Han H., et al., "EE2.1: Quadtree plus binary tree structure integration with JEM tools", Document: JVET-O0024, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 5 Pages.

Joshi R., et al., "High Efficiency Video Coding (HEVC) Screen Content Coding: Draft 6", Document: JCTVC-W1005_v4, Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, 10 Pages.

Karczewicz, et al., "Geometry Transformation-based Adaptive In-Loop Filter," Picture Coding Symposium (PCS), 2016, Dec. 4-7, 2016, 5 pp.

* cited by examiner

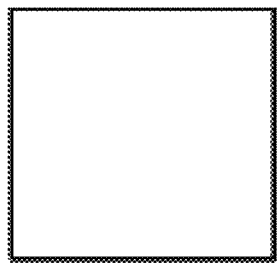 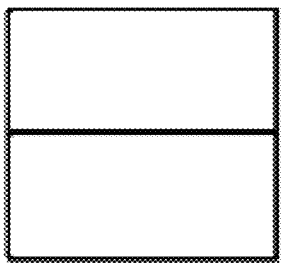 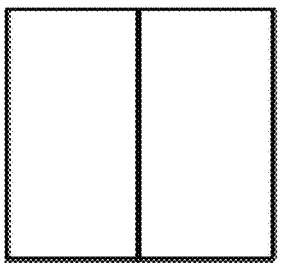 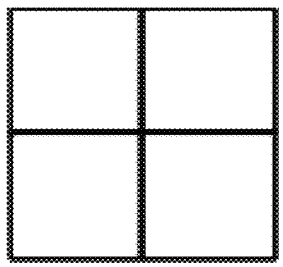
PART_2Nx2N    PART_2NxN    PART_Nx2N    PART_NxN
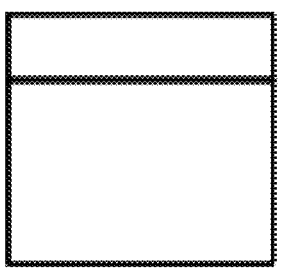 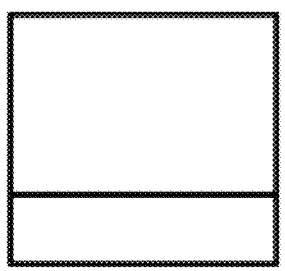 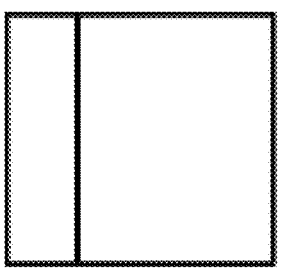 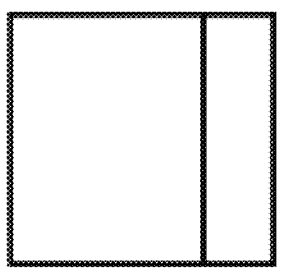
PART_2NxnU    PART_2NxnD    PART_nLx2N    PART_nRx2N
FIG. 2

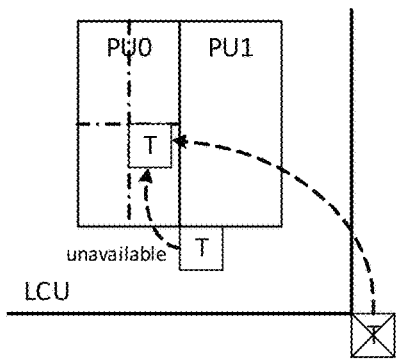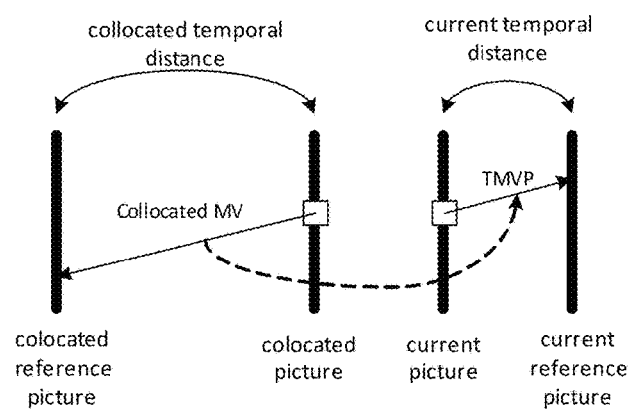
FIG. 5A  FIG. 5B

|         | P block |         |        |        | Q block |        |        |        |
|---------|---------|---------|--------|--------|---------|--------|--------|--------|
| $p3_0$  | $p2_0$  | $p1_0$  | $p0_0$ | $q0_0$ | $q1_0$  | $q2_0$ | $q3_0$ |        |
| $p3_1$  | $p2_1$  | $p1_1$  | $p0_1$ | $q0_1$ | $q1_1$  | $q2_1$ | $q3_1$ | First 4 lines |
| $p3_2$  | $p2_2$  | $p1_2$  | $p0_2$ | $q0_2$ | $q1_2$  | $q2_2$ | $q3_2$ |        |
| $p3_3$  | $p2_3$  | $p1_3$  | $p0_3$ | $q0_3$ | $q1_3$  | $q2_3$ | $q3_3$ |        |
| $p3_4$  | $p2_4$  | $p1_4$  | $p0_4$ | $q0_4$ | $q1_4$  | $q2_4$ | $q3_4$ |        |
| $p3_5$  | $p2_5$  | $p1_5$  | $p0_5$ | $q0_5$ | $q1_5$  | $q2_5$ | $q3_5$ | Second 4 lines |
| $p3_6$  | $p2_6$  | $p1_6$  | $p0_6$ | $q0_6$ | $q1_6$  | $q2_6$ | $q3_6$ |        |
| $p3_7$  | $p2_7$  | $p1_7$  | $p0_7$ | $q0_7$ | $q1_7$  | $q2_7$ | $q3_7$ |        |

FIG. 8

ENHANCED DEBLOCKING FILTERING DESIGN IN VIDEO CODING

This application claims the benefit of U.S. Provisional Patent Application 62/474,013, filed Mar. 20, 2017, and U.S. Provisional Patent Application 62/504,824, filed May 11, 2017, the entire content of each of which is incorporated herein by reference.

TECHNICAL FIELD

This disclosure relates to computing devices configured to perform video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to de-blocking filter in video codecs. For instance, multiple-edge deblocking filtering in addition to only horizontal and vertical edges, deblocking filter for inner boundaries within one transform unit, parameter settings used in deblocking filter under the assumption of other in-loop filtering methods are proposed. Techniques of this disclosure may be applied to existing video codecs, such as HEVC (High Efficiency Video Coding), or be an efficient coding tool in any future video coding standards.

In one example, this disclosure describes a method of encoding video data, the method comprising: reconstructing pixels of a current block; applying a deblocking filter to the reconstructed pixels of the current block to derive deblocking-filtered reconstructed pixels of the current block; calculating distortion values based on values of the deblocking-filtered reconstructed pixels of the current block and original pixels of the current block; and selecting, based on the calculated distortion values, an encoding mode for the current block, the encoding mode for the current block being a partitioning mode for the current block or a coding unit mode for the current block.

In another example, this disclosure describes an apparatus for encoding video data, the apparatus comprising: one or more storage media configured to store the video data; and one or more processing circuits coupled to the one or more storage media, the one or more processing circuits configured to: reconstruct pixels of a current block of the video data; apply a deblocking filter to the reconstructed pixels of the current block to derive deblocking-filtered reconstructed pixels of the current block; calculate distortion values based on values of the deblocking-filtered reconstructed pixels of the current block and original pixels of the current block; and select, based on the calculated distortion values, an encoding mode for the current block, the encoding mode for the current block being a partitioning mode for the current block or a coding unit mode for the current block.

In another example, this disclosure describes an apparatus for encoding video data, the apparatus comprising: means for reconstructing pixels of a current block; means for applying a deblocking filter to the reconstructed pixels of the current block to derive deblocking-filtered reconstructed pixels of the current block; means for calculating distortion values based on values of the deblocking-filtered reconstructed pixels of the current block and original pixels of the current block; and means for selecting, based on the calculated distortion values, an encoding mode for the current block, the encoding mode for the current block being a partitioning mode for the current block or a coding unit mode for the current block.

In another example, this disclosure describes a computer-readable storage medium storing instructions that, when executed, cause one or more processors to: reconstruct pixels of a current block; apply a deblocking filter to the reconstructed pixels of the current block to derive deblocking-filtered reconstructed pixels of the current block; calculate distortion values based on values of the deblocking-filtered reconstructed pixels of the current block and original pixels of the current block; and select, based on the calculated distortion values, an encoding mode for the current block, the encoding mode for the current block being a partitioning mode for the current block or a coding unit mode for the current block.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 2 illustrates eight example partitioning modes that may be used to define prediction units for an inter-coded coding unit (CU).

FIG. 5A illustrates an example temporal motion vector prediction (TMVP) candidate.

FIG. 5B illustrates an example of MV scaling.

FIG. 8 illustrates the pixels involved in an on/off filter decision and a strong/weak filter selection.

DETAILED DESCRIPTION

Figure 1:
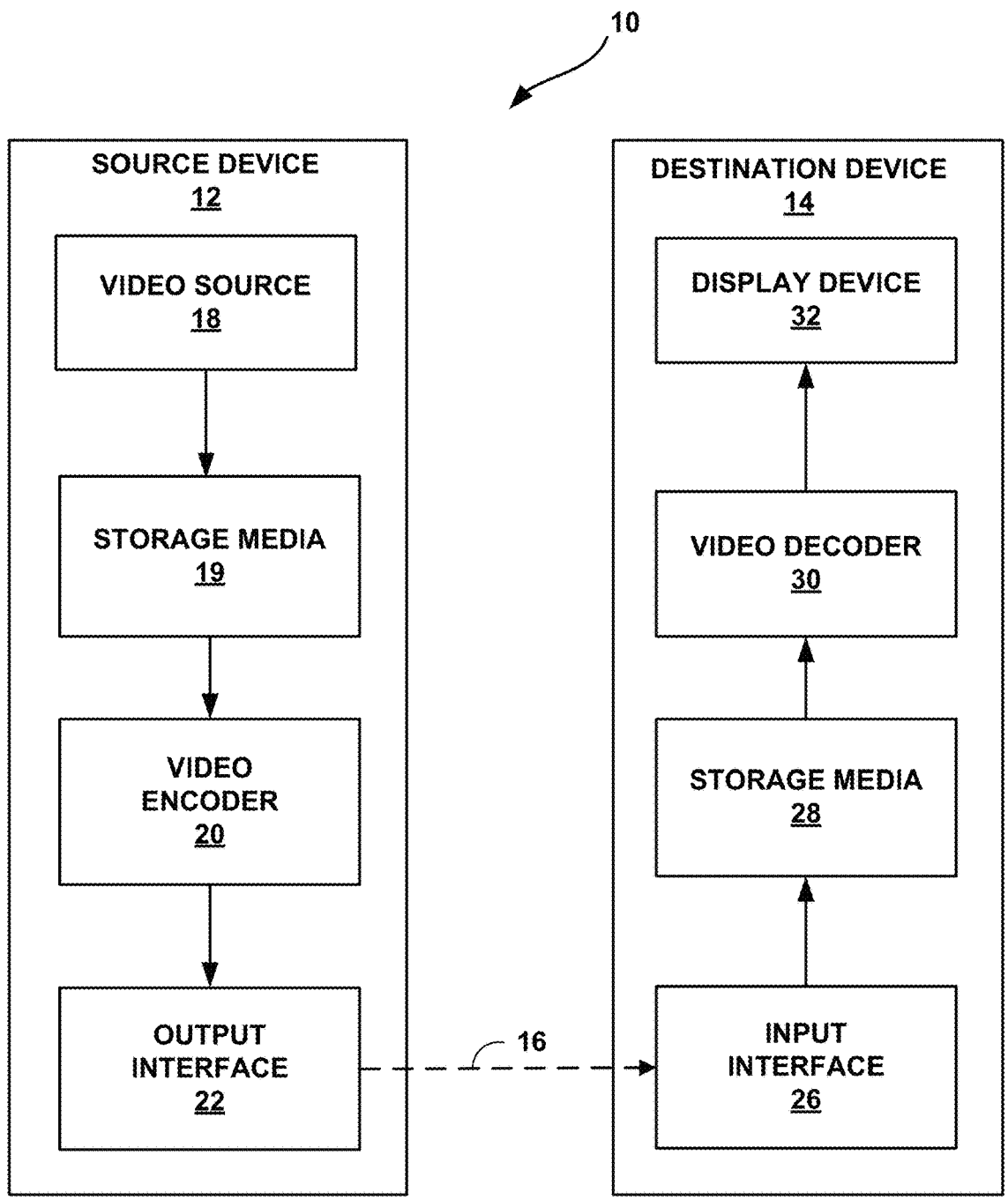
FIG. 1 is a block diagram illustrating an example video encoding and decoding system that may use one or more techniques described in this disclosure.

Video coders (e.g., video encoders or video decoders) may use deblocking filters to improve the visual quality of decoded pictures by reducing the appearance of blocking artifacts that occur at the boundaries between blocks. For example, a video coder may use a deblocking filter at a boundary between two prediction units (PUs), two transform units (TUs), or two coding units (CUs). In High Efficiency Video Coding (HEVC) and other video coding standards, video coders apply deblocking filters outside a coding loop. Consequently, the filtered pixels are not used for encoding or decoding subsequent blocks or pictures. However, a video decoder may output pictures that include the filtered pixels for display. This disclosure may use the terms pixel and sample interchangeably.

A video encoder may encode a block using various coding modes and may then select one of the resulting encoded representations of the block for inclusion in a bitstream. For example, the video encoder may partition a coding tree unit (CTU) into CUs according to a plurality of partitioning modes and may generate an encoded representation of the CTU for each of the partitioning modes. In this example, the video encoder may then determine which of the encoded representations of the CTU has the best rate-distortion cost. In another example, the video coder may encode a CU using intra prediction and using inter prediction. In this example, the video encoder may then determine whether the version encoded using intra or inter prediction has the best rate-distortion cost. The distortion component of a rate-distortion cost of a block is a metric of the difference between original values of pixels of the block and values of decoded pixels of the same block.

Because video coders apply deblocking filters outside of the coding loop (e.g., in a reconstruction loop), the values of the filtered pixels of a block are not available for use by a video encoder when the video encoder is selecting a partitioning mode and/or a coding unit mode (e.g., an intra or inter prediction mode, an affine prediction mode, a translational motion prediction mode, or other types of CU-level coding modes) for the block. For example, the video encoder may use a rate-distortion cost to select a partitioning mode and/or a coding unit mode for a block. In this example, the video encoder does not determine the distortion component of a rate-distortion cost of a block based on the filtered pixels. Rather, the video encoder determines the distortion component of the rate-distortion cost of the block based on the non-filtered pixels. An affine prediction mode is based on a rotation and/or zooming of a reference block. A translational motion prediction mode is a motion prediction mode based on the translation (i.e., spatial displacement) of a reference block without rotation or zooming.

In accordance with one or more techniques of this disclosure, a video encoder reconstructs pixels of a current block. Additionally, the video encoder applies a deblocking filter to the reconstructed pixels of the current block to derive deblocking-filtered reconstructed pixels of the current block. Furthermore, the video encoder may calculate distortion values based on values of the deblocking-filtered reconstructed pixels of the current block and original pixels of the current block. The video encoder may select, based on the calculated distortion values, an encoding mode for the current block. The encoding mode for the current block may be a partitioning mode or a CU mode for the current block. The partitioning mode may be the mode used to partition a CTU into CUs. Using the deblocking-filtered reconstructed pixels may improve the accuracy with which the video encoder selects the encoding mode.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC). A draft of the HEVC specification, and referred to as HEVC WD hereinafter, is available from http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first meeting was held during 19-21 Oct. 2015. Chen et al., "Algorithm description of Joint Exploration Test Model 5 (JEM5)", Joint Video Exploration Team (JVET) of ITU-T SG 16 WP 3 and ISO/IEC JTC 1/SC 29/WG 11, 5th Meeting: Geneva, CH, 12-20 Jan. 2017, document JVET-E1001, (hereinafter, JVET-E1001) describes algorithms of Joint Exploration Test Model 5.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in an bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. In some video coding standards and proposals, including the JEM, a CU is not subdivided into PUs. Thus, in such instances, references to a PU of a CU may be interpreted in this disclosure as simply the CU itself.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction_unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

Thus, in HEVC, the largest coding unit in a slice is called a coding tree block (CTB). A CTB contains a quad-tree the nodes of which are coding units. The size of a CTB can range from 16×16 to 64×64 in the HEVC main profile (although technically 8×8 CTB sizes can be supported). A CU can be the same size of a CTB although and as small as 8×8. Each CU is coded with one mode. When a CU is inter coded, the CU may be further partitioned into 2 or 4 prediction units (PUs) or become just one PU when further partition does not apply. When two PUs are present in one CU, the two PUs can be half size rectangles or two rectangle size with ¼ or ¾ size of the CU. When the CU is inter coded, one set of motion information is present for each PU. In addition, each PU is coded with a unique inter-prediction mode to derive the set of motion information.

The PU is a region, defined by partitioning the CU, on which the same prediction is applied. In general, the PU is not restricted to being square in shape, to facilitate partitioning which matches the boundaries of real objects in the picture. Each CU contains one, two or four PUs depending on the partitioning mode. FIG. 2 illustrates eight example partitioning modes that may be used to define the PUs for an inter-coded CU. The PART_2N×2N and PART_N×N partitioning modes are used for an intra-coded CU. The partitioning mode PART_N×N is allowed only when the corresponding CU size is equal to the minimum CU size. In some codecs, CUs are not further partitioned into PUs. Thus, in such codecs, a PU may be the same concept as a CU.

In HEVC and some other codecs, video encoder 20 encodes a CU using only one prediction mode (i.e., intra prediction or inter prediction). Thus, in HEVC and particular other codecs, video encoder 20 may generate predictive blocks of each PU of a CU using intra prediction or video encoder 20 may generate predictive blocks of each PU of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partitioning modes for a CU coded with inter prediction mode, i.e., PART_2N×2N, PART_2N×N, PART_N×2N, PART_N×N, PART_2N×nU, PART_2N×nD, PART_nL×2N and PART_nR×2N. When a CU is intra predicted, 2N×2N and N×N are the only permissible PU shapes, and within each PU a single intra prediction mode is coded (while chroma prediction mode is signalled at CU level).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block. In some video coding standards and proposals, including the JEM, a CU is not subdivided into TUs. Thus, in such instances, references to a TU of a CU may be interpreted in this disclosure as simply the CU itself.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

Figure 3:
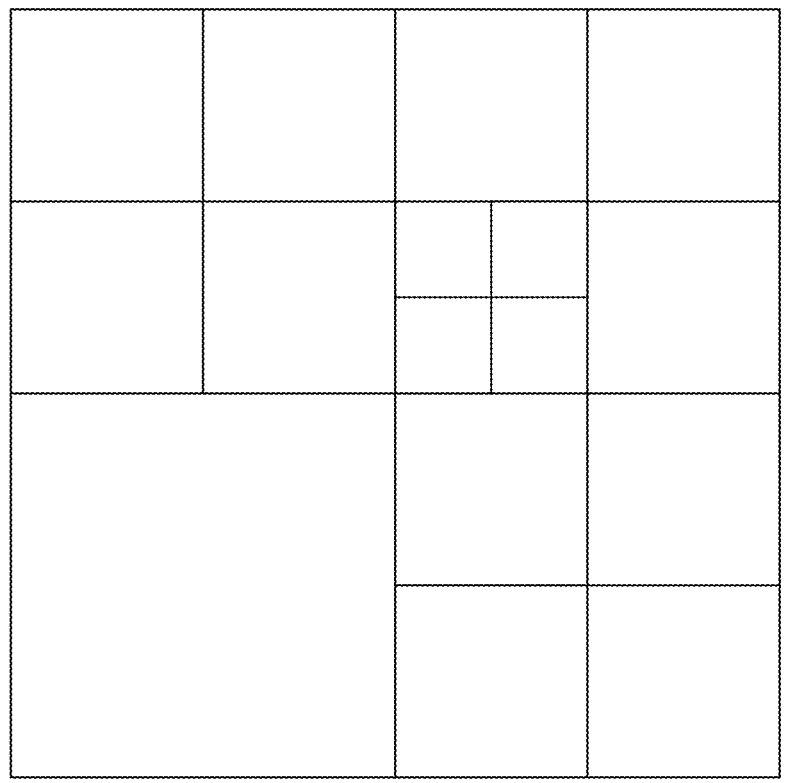
FIG. 3 is an example of a transform tree structure within a CU.

Thus, each CU may correspond to one transform tree, which in HEVC is a quad-tree, the leaf of which is a TU. The TU is a square region, defined by quadtree partitioning of the CU, which shares the same transform and quantization processes. The quadtree structure of multiple TUs within a CU is illustrated in FIG. 3. FIG. 3 is an example of a transform tree structure within a CU. In some examples, the TU shape is always square and the TU may take a size from 32×32 down to 4×4 samples. The maximum quadtree depth is adjustable and is specified in the slice header syntax. For an inter CU, the TU can be larger than PU, i.e. the TU may contain PU boundaries. However, in some examples, the TU cannot cross PU boundaries for an intra CU. In addition, the node corresponding to a CU which does not to transform. A node inside a transform tree, if it has split_transform_flag equal to 1, it is further split into four nodes, a leaf of the transform tree has split_transform_flag equal to 0. For simplicity, if a TU or transform tree corresponds to a block which does not have a transform, the block may also be considered a transform tree or transform unit, since the hierarchy of the transform itself still exists.

Rqt_root_cbf equal to 1 specifies that the transform_tree syntax structure is present for the current CU. rqt_root_cbf equal to 0 specifies that the transform_tree syntax structure is not present for the current CU. When rqt_root_cbf is not present, its value is inferred to be equal to 1. When rqt_root_cbf is equal to 0, the transform tree only contains one node, meaning it is not further split and the split_transform_flag is equal to 0. A CBF of a transform unit equal to 1 specifies that the transform unit contains one or more transform coefficient levels not equal to 0. A CBF of a transform unit equal to 0 specifies that all transform coefficient levels of the transform unit are 0. A CBF is set for each component of the transform unit, i.e., cbf is set for luma, cb and cr component respectively.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, a video coder (e.g., video encoder 20 or video decoder 30) may apply inter prediction to generate a predictive block for a video block of a current picture. For instance, in the context of HEVC and other video coding specifications, the video coder may apply inter prediction to generate a predictive block for a prediction block of a PU of a CU of the current block. If the video coder applies inter prediction to generate a predictive block, the video coder may generate the predictive block based on decoded samples of one or more reference pictures. The reference pictures are pictures other than the current picture. The video coder may determine one or more reference picture lists. Each of the reference picture lists may include zero or more reference pictures. In the context of HEVC and other video coding specifications, one of the reference picture lists may be referred to as Reference Picture List 0 (RefPicList0) and another reference picture list may be referred to as Reference Picture list 1 (RefPicList1).

The video coder may apply uni-directional inter prediction or bi-directional inter prediction to generate a predictive block. When the video coder applies uni-directional inter prediction to generate a predictive block for a video block, the video coder determines a single reference block for the video block based on a samples of a single reference picture. Furthermore, when the video coder applies uni-directional inter prediction, the video coder may set the predictive block equal to the reference block. When the video coder applies bi-directional inter prediction to generate a predictive block for a video block, the video coder determines two reference blocks for the video block. In some examples, the two reference blocks are in reference pictures in different reference picture lists. Additionally, when the video coder applies bi-direction inter-prediction, the video coder may determine the predictive block based on the two reference blocks. For instance, the video coder may determine the predictive block such that each sample of the predictive block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the predictive block is a weighted average of two or more samples of the reference picture.

In some examples, when video encoder 20 performs uni-directional inter prediction, video encoder 20 searches for a reference block within one or more reference pictures in one of the reference picture lists. The reference block may be a block of samples that is similar to the prediction block. In some examples, video encoder 20 uses a mean squared error to determine the similarity between the reference block and the prediction block Furthermore, video encoder 20 may determine motion information for the prediction block. The motion information (i.e., the motion parameters) for the prediction block may include a motion vector and a reference index. The motion vector may indicate a spatial displacement between a position of the particular video block within the current picture (i.e., the picture that includes the particular video block) and a position of the reference block within the reference picture. The reference index indicates a position within the reference picture list of the reference frame that contains the reference picture list. The predictive block for the particular video block may be equal to the reference block.

When video encoder 20 performs bi-directional inter prediction for a particular video block, video encoder 20 may search for a first reference block within reference pictures in a first reference picture list ("list 0") and may search for a second reference block within reference pictures in a second reference picture list ("list 1"). Video encoder 20 may generate, based at least in part on the first and the second reference blocks, the predictive block for the particular video block. In addition, video encoder 20 may generate a first motion vector that indicates a spatial displacement between the particular video block and the first reference block. Video encoder 20 may also generate a first reference index that identifies a location within the first reference picture list of the reference picture that contains the first reference block. Furthermore, video encoder 20 may generate a second motion vector that indicates a spatial displacement between the particular video block and the second reference block. Video encoder 20 may also generate a second reference index that identifies a location within the second reference picture list of the reference picture that includes the second reference block.

When video encoder 20 performs uni-directional inter prediction on a particular video block, video decoder 30 may use the motion information of the particular video block to identify the reference block of the particular video block. Video decoder 30 may then generate the predictive block of the particular video block based on the reference block. When video encoder 20 performs bi-directional inter prediction to determine a predictive block for a particular video block, video decoder 30 may use the motion information of the particular video block to determine two reference blocks. Video decoder 30 may generate the predictive block of the particular video block based on the two reference samples of the particular video block.

Thus, in at least some of the examples provided above, for each block, a set of motion information can be available. A set of motion information contains motion information for forward and backward prediction directions. Here, forward and backward prediction directions are two prediction directions of a bi-directional prediction mode and the terms "forward" and "backward" do not necessarily have a geometry meaning, instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

In some examples, for each prediction direction, the motion information must contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Video encoder 20 may signal motion information of a video unit in various ways. Such motion information may include motion vectors, reference indexes, reference picture list indicators, and/or other data related to motion. In some examples, video encoder 20 and video decoder 30 may use motion prediction to reduce the amount of data used for signaling motion information. Motion prediction may comprise the determination of motion information of a video unit (e.g., a PU) based on motion information of one or more other video units. There are various types of motion prediction. For instance, merge mode and advanced motion vector prediction (AMVP) mode are two types of motion prediction.

In merge mode, video encoder 20 generates a candidate list. The candidate list includes a set of candidates that indicate the motion information of one or more source video units. The source video units may spatially or temporally neighbor a current video unit. Furthermore, in merge mode, video encoder 20 may select a candidate from the candidate list and may use the motion information indicated by the selected candidate as the motion information of the current video unit. Video encoder 20 may signal the position in the candidate list of the selected candidate. Video decoder 30 may determine, based on information obtained from a bitstream, the index into the candidate list. In addition, video decoder 30 may generate the same candidate list and may determine, based on the index, the selected candidate. Video decoder 30 may then use the motion information of the selected candidate to generate a predictive block for the current video unit.

AMVP mode is similar to merge mode in that video encoder 20 may generate a candidate list and may select a candidate from the candidate list. However, for each respective reference block used in determining a predictive block for a current video unit, video encoder 20 may signal a respective motion vector difference (MVD) for the current video unit, a respective reference index for the current video unit, and a respective candidate index indicating a selected candidate in the candidate list. An MVD for a video unit may indicate a difference between a motion vector of the video unit and a motion vector of the selected candidate. The reference index for the current video unit indicates a reference picture from which a reference block is determined.

Furthermore, when AMVP mode is used, for each respective reference block used in determining a predictive block for the current video unit, video decoder 30 may determine a MVD for the current video unit, a reference index for the current video unit, and a candidate index and a motion vector prediction (MVP) flag. Video decoder 30 may generate the same candidate list and may determine, based on the candidate index, a selected candidate in the candidate list. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder (e.g., video encoder 20 or video decoder 30) generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block of the PU (or other type of sample block of the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture. A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

Thus, in the HEVC standard and other codecs, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

In HEVC and other codecs, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 4A:
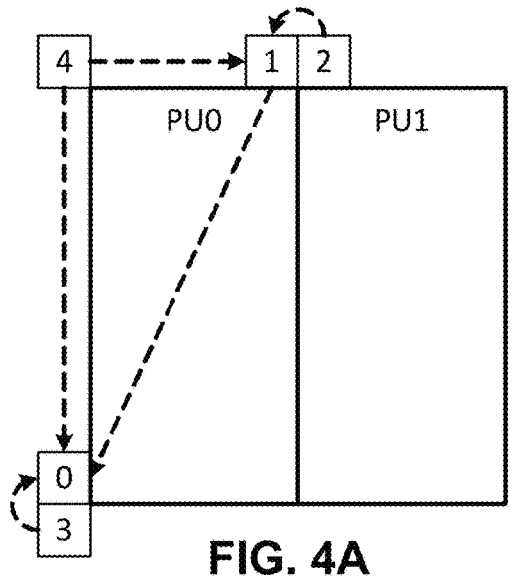
FIG. 4A illustrates example spatial neighboring motion vector (MV) candidates for merge mode.

Spatial MV candidates are derived from the neighboring blocks shown on FIG. 4, for a specific PU ($PU_0$), although the methods generating the candidates from the blocks differ for merge and AMVP modes. In merge mode, up to four spatial MV candidates can be derived with the orders showed on FIG. 4A with numbers, and the order is the following: left (0), above (1), above right (2), below left (3), and above left (4), as shown in FIG. 4A.

Figure 4B:
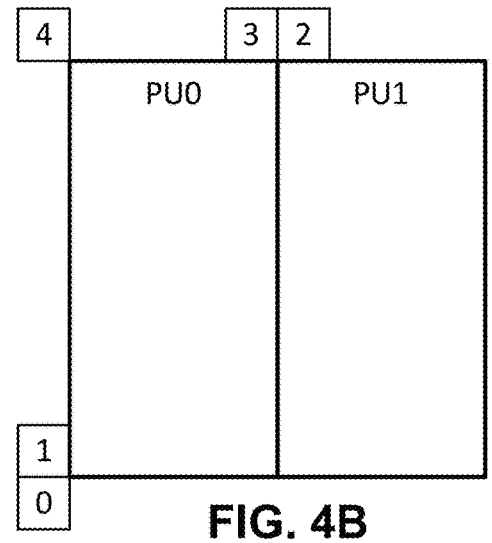
FIG. 4B illustrates example spatial neighboring MV candidates for advanced motion vector prediction (AMVP) mode.

In AMVP mode, the neighboring blocks are divided into two groups: left group consisting of the block 0 and 1, and above group consisting of the blocks 2, 3, and 4 as shown in FIG. 4B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate, thus the temporal distance differences can be compensated. Thus, FIG. 4A illustrates example spatial neighboring MV candidates for merge mode. FIG. 4B illustrates example spatial neighboring MV candidates for AMVP mode.

Furthermore, a temporal motion vector predictor (TMVP) candidate, if enabled and available, may be added into the MV candidate list after spatial motion vector candidates. The process of motion vector derivation for TMVP candidate may be the same for both merge and AMVP modes, however the target reference index for the TMVP candidate in the merge mode is always set to 0. In HEVC and other examples, the primary block location for TMVP candidate derivation is the bottom right block outside of the collocated PU as shown in FIG. 5A as a block "T", to compensate the bias to the above and left blocks used to generate spatial neighboring candidates. However, if that block is located outside of the current CTB row or motion information is not available, the block is substituted with a center block of the PU. Thus, FIG. 5A illustrates an example TMVP candidate. FIG. 5B illustrates an example of MV scaling. Motion vector for TMVP candidate is derived from the co-located PU of the co-located picture, indicated in the slice level. Similar to temporal direct mode in AVC, a motion vector of the TMVP candidate motion vector scaling which is performed to compensate the distance differences.

As noted above, a bitstream may include a representation of encoded pictures of the video data and associated data. The associated data may include parameter sets. In HEVC and other video coding specifications, NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

In HEVC, after a slice is decoded and reconstructed, a Deblocking Filter (DF) process is performed for each CU in the same order as the decoding process. First, vertical edges are filtered (horizontal filtering) then horizontal edges are filtered (vertical filtering). Filtering is applied to 8×8 block boundaries which are determined to be filtered, both for luma and chroma components. 4×4 block boundaries are not processed in order to reduce the complexity.

Figure 6:
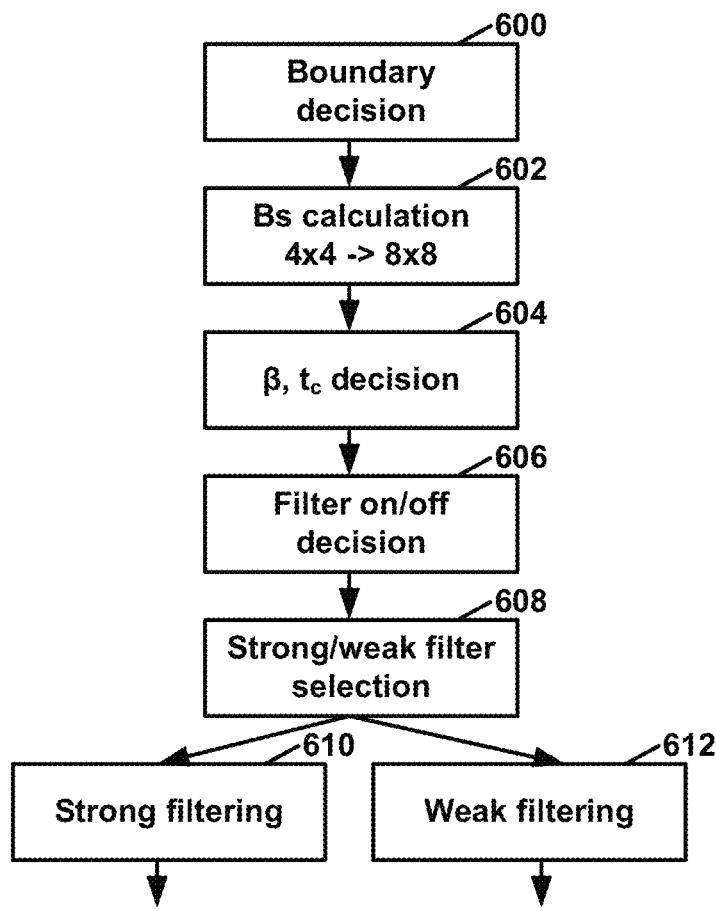
FIG. 6 illustrates an example overall flow of deblocking filter processes.

FIG. 6 illustrates an example overall flow of deblocking filter processes. Two kinds of boundaries are involved in the deblocking filter process: TU boundaries and PU boundaries. CU boundaries are also considered, since CU boundaries are necessarily also TU and PU boundaries.

In the example of FIG. 6, a video coder (e.g., video encoder 20 or video decoder 30) may perform a boundary decision (600). Additionally, the video coder may perform a boundary stream (Bs) calculation (602). The boundary strength (Bs) reflects how strong a filtering process may be needed for the boundary. A value of 0 indicates no deblocking filtering. Furthermore, the video coder may perform a β and $t_C$ decision (604).

A boundary can have three filtering status values: no filtering, weak filtering and strong filtering. Each filtering decision is based on boundary strength denoted by Bs, and threshold values, β and $t_C$. Accordingly, the video coder may make a filter on/off decision (606). Assuming the video coder makes the decision to turn on the filter, the video coder performs a strong/weak filter selection (608). Based on the strong/weak filter selection, the video coder may apply strong filtering (610) or weak filtering (612).

Figure 7:
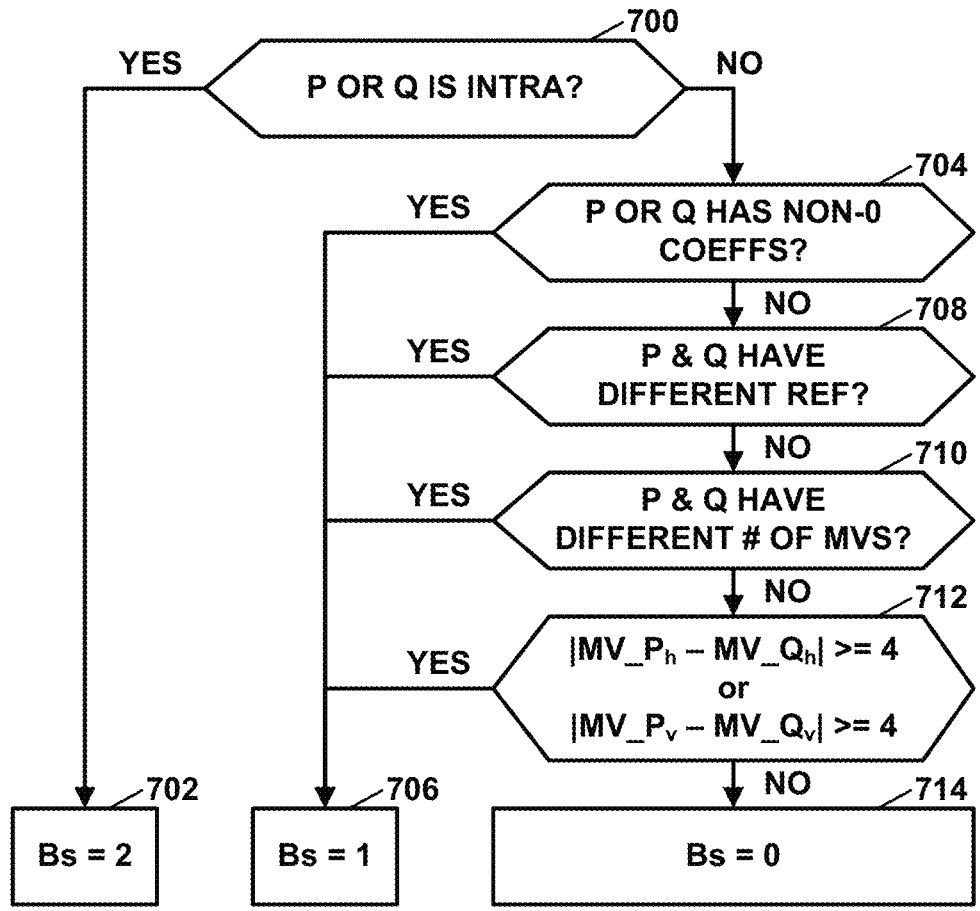
FIG. 7 is a flow diagram for a Bs calculation.

FIG. 7 is a flow diagram for a Bs calculation. Let P and Q be defined as blocks which are involved in the filtering, where P represents the block located to the left (vertical edge case) or above (horizontal edge case) the boundary and Q represents the block located to the right (vertical edge case) or above (horizontal edge case) the boundary. Particularly, FIG. 7 illustrates how the Bs value is calculated based on the intra coding mode, the existence of non-zero transform coefficients, reference picture, number of motion vectors and motion vector difference.

As shown in FIG. 7, a video coder (e.g., video encoder 20 or video decoder 30), may determine whether either P or Q is an intra block (700). In other words, the video coder may determine whether either P or Q was generated using intra prediction. If either P or Q is an intra block ("YES" branch of 700), the video coder determines the Bs is equal to 2 (702). Otherwise, if neither P or Q is an intra block ("NO" branch of 700), the video coder may determine whether P or Q has one or more non-zero coefficients (704). If P or Q has one or more non-zero coefficients ("YES" branch of 704), the video coder may determine that the Bs is equal to 1 (706). If neither P nor Q has any non-zero coefficients ("NO" branch of 704), the video coder may determine whether P and Q have different reference pictures (708). If P and Q have different reference pictures ("YES" branch of 708), the video coder may determine that Bs is equal to 1 (706). If P and Q do not have different reference pictures (i.e., P and Q have the same reference picture) ("NO" branch of 708), the video coder may determine whether P and Q have different numbers of motion vectors (710). P and Q may have different numbers of motion vectors if one or P or Q is uni-directionally inter predicted and the other of P and Q is bi-directionally inter predicted. If P and Q have different numbers of motion vectors ("YES" branch of 710), the video coder may determine that Bs is equal to 1 (706). If P and Q do not have different numbers of motion vectors (i.e., P and Q have the same number of motion vectors) ("NO" branch of 710), the video coder may determine whether an absolute value of a difference between a first motion vector of P (i.e., $MV\_P_h$) and a first motion vector of Q (i.e., $MV\_Q_h$) is greater than or equal to 4 or an absolute value of a difference between a second motion vector of P (i.e., $MV\_P_v$) and a second motion vector of Q (i.e., $MV\_Q_v$) is greater than or equal to 4 (712). If so ("YES" branch of 712), the video coder may determine that Bs is equal to 1 (706). Otherwise ("NO" branch of 712), the video coder may determine that Bs is equal to 0 (714).

As noted above, threshold values β and $t_C$ are involved in the filter on/off decision, strong and weak filter selection and weak filtering process. Threshold values β and $t_C$ may be derived from the value of the luma quantization parameter Q as shown in Table 1, below.

TABLE 1

Derivation of threshold variables from input Q

| Q | | | | | | | | | | | | | | | | | | | |
|---|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 | 18 |
| β' | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |

| Q | | | | | | | | | | | | | | | | | | | |
|---|---|---|---|---|---|---|---|---|---|---|---|---|---|---|---|---|---|---|---|
|  | 19 | 20 | 21 | 22 | 23 | 24 | 25 | 26 | 27 | 28 | 29 | 30 | 31 | 32 | 33 | 34 | 35 | 36 | 37 |
| β' | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 1 | 2 | 2 | 2 | 2 | 3 | 3 | 3 | 3 | 4 | 4 | 4 |

| Q | | | | | | | | | | | | | | | | |
|---|---|---|---|---|---|---|---|---|---|---|---|---|---|---|---|---|
|  | 38 | 39 | 40 | 41 | 42 | 43 | 44 | 45 | 46 | 47 | 48 | 49 | 50 | 51 | 52 | 53 |
| β' | 38 | 40 | 42 | 44 | 46 | 48 | 50 | 52 | 54 | 56 | 58 | 60 | 62 | 64 | — | — |
| $t_C'$ | 5 | 5 | 6 | 6 | 7 | 8 | 9 | 10 | 11 | 13 | 14 | 16 | 18 | 20 | 22 | 24 |

In HEVC and other codecs, the variable β is derived from β' as follows:

$$\beta=\beta'*(1<<(BitDepth_Y-8))$$

The variable $t_C$ is derived from $t_C'$ as follows:

$$t_C=t_C'*(1<<(BitDepth_Y-8))$$

$BitDepth_Y$ indicates the bit depths of luma samples.

The deblocking parameters $t_C$ and β provide adaptivity according to the QP and prediction type. However, different sequences or parts of the same sequence may have different characteristics. Accordingly, it may be important for content providers to change the amount of deblocking filtering on the sequence or even on a slice or picture basis. Therefore, deblocking adjustment parameters can be sent in the slice header or PPS to control the amount of deblocking filtering applied. The corresponding parameters are tc-offset-div2 and beta-offset-div2, as described in T. Yamakage, S. Asaka, T. Chujoh, M. Karczewicz, and I. S. Chong, CE12: Deblocking Filter Parameter Adjustment in Slice Level, ITUT SG16 WP3 and ISO/IEC JTC1/SC29/WG11 document JCTVC-G174, Joint Collaborative Team on Video Coding (JCTVC), Geneva, Switzerland, November 2011. These parameters specify the offsets (divided by two) that are added to the QP value before determining the β and $t_C$ values. The parameter beta-offset-div2 adjusts the number of pixels to which the deblocking filtering is applied, whereas parameter tc-offset-div2 adjusts the amount of filtering that can be applied to those pixels, as well as detection of natural edges.

To be more specific, the following ways are used to re-calculate the 'Q' for the look-up tables:

For $t_C$ calculation:

$$Q=Clip3(0,53,(QP+2*(Bs-1)+(tc\text{-}offset\text{-}div2<<1)));$$

For β calculation:

$$Q=Clip3(0,53,(QP+(beta\text{-}offset\text{-}div2<<1)));$$

In above equations, the QP indicates the derived value from the luma/chroma QPs of the two neighboring blocks along the boundary.

JCTVC-G174 provides the following syntax tables and semantic descriptions in support of the deblocking adjustment parameters tc-offset-div2 and beta-offset-div2:

Syntax Tables
7.3.2.3.1 General Picture Parameter Set RBSP Syntax

| pic_parameter_set_rbsp( ) { | Descriptor |
|---|---|
| ... | |
| pps_loop_filter_across_slices_enabled_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|   } | |
| } | |
| ... | |
| } | |

7.3.6.1 General Slice Segment Header Syntax

| slice_segment_header( ) { | Descriptor |
|---|---|
| ... | |
| slice_qp_delta | se(v) |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |

-continued

| slice_segment_header( ) { | Descriptor |
|---|---|
|   } | |
| } | |
| if( pps_loop_filter_across_slices_enabled_flag && | |
|   ( slice_sao_luma_flag \|\| slice_sao_chroma_flag \|\| | |
|    !slice_deblocking_filter_disabled_flag ) ) | |
|     slice_loop_filter_across_slices_enabled_flag | u(1) |
| } | |
| ... | |
| } | |

Semantics pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for $\beta$ and $t_C$ (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0, and pps_scaling_list_data_present_flag is equal to 0, the default scaling list data are used to derive the array ScalingFactor as described in the scaling list data semantics as specified in clause 7.4.5.

deblocking_filter_override_flag equal to 1 specifies that deblocking parameters are present in the slice header. deblocking_filter_override_flag equal to 0 specifies that deblocking parameters are not present in the slice header. When not present, the value of deblocking_filter_override_flag is inferred to be equal to 0.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to pps_deblocking_filter_disabled_flag.

slice beta offset div2 and slice_tc_offset_div2 specify the deblocking parameter offsets for $\beta$ and $t_C$ (divided by 2) for the current slice. The values of slice_beta_offset_div2 and slice_tc_offset_div2 shall both be in the range of −6 to 6, inclusive. When not present, the values of slice_beta_off-set_div2 and slice_tc_offset_div2 are inferred to be equal to pps_beta_offset_div2 and pps_tc_offset_div2, respectively.

slice_loop_filter_across_slices_enabled_flag equal to 1 specifies that in-loop filtering operations may be performed across the left and upper boundaries of the current slice. slice_loop_filter_across_slices_enabled_flag equal to 0 specifies that in-loop operations are not performed across left and upper boundaries of the current slice. The in-loop filtering operations include the deblocking filter and sample adaptive offset filter. When slice_loop_filter_across_slices_enabled_flag is not present, it is inferred to be equal to pps_loop_filter_across_slices_enabled_flag.

Filter On/Off Decision for 4 Lines

As shown in action 606 of FIG. 6, a video coder may perform a filter on/off decision. The filter on/off decision may be made using 4 lines grouped as a unit, to reduce computational complexity. FIG. 8 illustrates the pixels involved in an on/off filter decision and a strong/weak filter selection. The 6 pixels in the two dashed boxes in the first 4 lines are used to determine whether the filter is on or off for those 4 lines. The 6 pixels in the two dashed boxes in the second group of 4 lines are used to determine whether the filter is on or off for the second group of 4 lines.

The following variables are defined:

$$dp0 = |p_{2,0} - 2 * p_{1,0} + p_{0,0}|$$

$$dp3 = |p_{2,3} - 2 * p_{1,3} + p_{0,3}|$$

$$dq0 = |q_{2,0} - 2 * q_{1,0} + q_{0,0}|$$

$$dq3 = |q_{2,3} - 2 * q_{1,3} + q_{0,3}|$$

If $dp0+dq0+dp3+dq3 < \beta$, filtering for the first four lines is turned on and the strong/weak filter selection process is applied. If this condition is not met, no filtering is done for the first 4 lines.

Additionally, if the condition is met, the variables dE, dEp1 and dEp2 are set as follows:

dE is set equal to 1, the first nearest pixel to the block boundary can be modified in block P and Q.

If $dp0+dp3 < (\beta+(\beta>>1))>>3$, the variable dEp1 is set equal to 1, the two nearest pixels to the block boundary can be modified in block P.

If $dq0+dq3 < (\beta+(\beta>>1))>>3$, the variable dEq1 is set equal to 1, the two nearest pixels to the block boundary can be modified in block Q.

A filter on/off decision is made in a similar manner as described above for the second group of 4 lines.

Strong/Weak Filter Selection for 4 Lines

As shown in action 608 of FIG. 6, if filtering is turned on, a decision is made between strong and weak filtering. The pixels involved are the same as those used for the filter on/off decision, as depicted in FIG. 8. If the following two sets of conditions are met, a video coder uses a strong filter for filtering of the first 4 lines. Otherwise, the video coder uses a weak filter.

$$2*(dp0+dq0) < (\beta>>2), |p3_0 - p0_0| + |q0_0 - q3_0| < (\beta>>3) \text{ and } |p0_0 - q0_0| < (5*t_C+1)>>1 \quad \text{1)}$$

$$2*(dp3+dq3) < (\beta>>2), |p3_3 - p0_3| + |q0_3 - q3_3| < (\beta>>3) \text{ and } |p0_3 - q0_3| < (5*t_C+1)>>1 \quad \text{2)}$$

The decision on whether to select strong or weak filtering for the second group of 4 lines may be made in a similar manner.

Strong Filtering

For strong filtering, the filtered pixel values are obtained by the following equations. Note that three pixels are modified using four pixels as an input for each P and Q block, respectively.

$p_0'=(p_2+2*p_1+2*p_0+2*q_0+q_1+4)>>3$ $q_0'=(p_1+2*p_0+2*q_0+2*q_1+q_2+4)>>3$ $p_1'=(p_2+p_1+p_0+q_0+2)>>2$ $q_1'=(p_0+q_0+q_1+q_2+2)>>2$ $p_2'=(2*p_3+3*p_2+p_1+p_0+q_0+4)>>3$ $q_2'=(p_0+q_0+q_1+3*q_2+2*q_3+4)>>3$

Weak Filtering

Δ is defined as follows.

$\Delta=(9*(q_0-p_0)-3*(q_1-p_1)+8)>>4$

When abs(Δ) is less than $t_C*10$, $\Delta=Clip3(-t_C,t_C,\Delta)$ $p_0'=Clip1_Y(p_0+\Delta)$ $q_0'=Clip1_Y(q_0-\Delta)$ If dEp1 is equal to 1, $\Delta p=Clip3(-(t_C>>1),t_C>>1,$
$(((p_2+p_0+1)>>1)-p_1+\Delta)>>1)$ $p_1'=Clip1_Y(p_1+\Delta p)$ If dEq1 is equal to 1, $\Delta q=Clip3(-(t_C>>1),t_C>>1,$
$(((q_2+q_0+1)>>1)-q_1-\Delta)>>1)$ $q_1'=Clip1_Y(q_1+\Delta q)$ Note that a maximum of two pixels are modified using three pixels as an input for each P and Q block, respectively.

Chroma Filtering

The boundary strength Bs for chroma filtering is inherited from luma. If Bs>1, chroma filtering is performed. No filter selection process is performed for chroma, since only one filter can be applied. The filtered sample values $p_0'$ and $q_0'$ are derived as follows.

$\Delta=Clip3(-t_C,t_C,((((q_0-p_0)<<2)+p_1-q_1+4)>>3))$ $p_0'=Clip1_C(p_0+\Delta)$ $q_0'=Clip1_C(q_0-\Delta)$ Quadtree Plus Binary Tree (QTBT)

H. Huang, K. Zhang, Y.-W. Huang, S. Lei, "EE2.1: Quadtree plus binary tree structure integration with JEM tools", Joint Video Exploration Team (JVET) of ITU-T SG 16 WP 3 and ISO/IEC JTC 1/SC 29/WG 11, 3rd Meeting, Geneva, CH, 26 May-1 Jun. 2016, document JVET-00024 (hereinafter, "JVET-00024) describes a QTBT structure. The QTBT structure is adopted in JEM software. In the QTBT structure, a coding tree block (CTB) is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices, the luma and chroma CTBs in one coding tree unit (CTU) share the same QTBT structure. For I slices, the luma CTB is partitioned into CBs by a QTBT structure, and two chroma CTBs are partitioned into chroma CBs by another QTBT structure. In an I slice, all PUs are intra predicted. Hence, if the PU is in an I slice, inter-prediction processing unit 1420 does not perform inter prediction on the PU.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), may be used for prediction (e.g. intra-picture or inter-picture prediction) and transform without any further partitioning. That is, in QTBT structure, the concept of CU/PU/TU is aligned and the three are always the same.

There are two splitting types in the binary tree splitting: symmetric horizontal splitting and symmetric vertical splitting.

In one example of the QTBT partitioning structure, the CTU size is set to 128×128 (luma samples and corresponding 64×64 Cb/Cr samples), the MinQTSize is set to 16×16, the MaxBTSize is set to 64×64, the MinBTSize (for both width and height) is set to 4, and the MaxBTDepth is set to 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, the leaf quadtree node is not be further split by the binary tree since the size exceeds the MaxBTSize (i.e., 64×64). Otherwise, the leaf quadtree node may be further partitioned by the binary tree. Therefore, the quadtree leaf node is also the root node for the binary tree and its binary tree depth is defined as 0. When the binary tree depth reaches MaxBTDepth (i.e., 4), it implies no further splitting. When the binary tree node has a width equal to MinBTSize (i.e., 4), it implies no further horizontal splitting. Similarly, when the binary tree node has a height equal to MinBTSize, it implies no further vertical splitting. The leaf nodes of the binary tree, namely CUs, are further processed by prediction and transform without any further partitioning.

For an I slice, a luma-chroma-separated block partitioning structure is proposed. The luma component of one CTU (i.e., the luma CTB) is partitioned by a QTBT structure into luma coding blocks, and the two chroma components of that CTU (i.e., the two chroma CTBs) are partitioned by another QTBT structure into chroma coding blocks. For P and B slice, the block partitioning structure for luma and chroma is shared. That is, one CTU (including both luma and chroma) is partitioned by one QTBT structure into CUs.

Figure 9A:
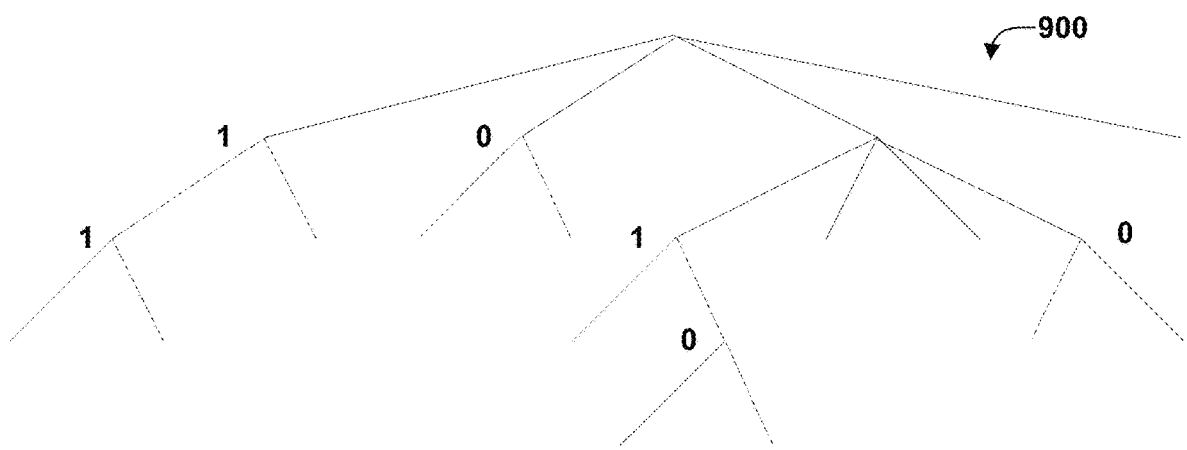
FIG. 9A illustrates an example block partitioning using a quadtree plus binary tree structure (QTBT).
Figure 9B:
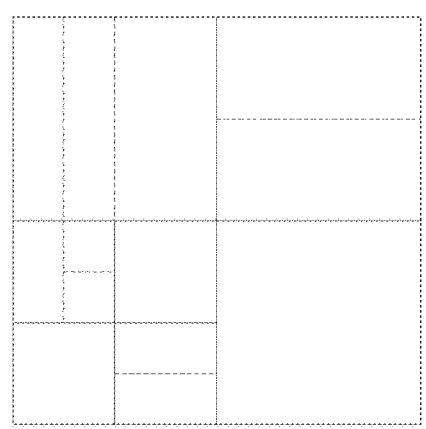
FIG. 9B illustrates an example a tree structure corresponding to the block partitioning of FIG. 9A.

FIGS. 9A and 9B are conceptual diagrams illustrating an example quadtree binary tree (QTBT) structure 900, and a corresponding coding tree unit (CTU) 902. Specifically, FIG. 9A illustrates an example block partitioning using a quadtree plus binary tree structure (QTBT). FIG. 9B illustrates an example a tree structure corresponding to the block partitioning of FIG. 9A. In FIGS. 9A and 9B, the solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 900 (i.e., the solid lines) and syntax elements (such as splitting information) for a prediction tree level of QTBT structure 902 (i.e., the dashed lines). Video encoder 20 may encode, and video decoder 30 may decode, video data, such as prediction and transform data, for CUs represented by terminal leaf nodes of QTBT structure 900.

In general, CTU 902 of FIG. 9B may be associated with parameters defining sizes of blocks corresponding to nodes of QTBT structure 900 at the first and second levels. These parameters may include a CTU size (representing a size of CTU 902 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

Sub-PU Based Motion Prediction

In the JEM with QTBT, each CU can have at most one set of motion parameters for each prediction direction. Two sub-CU level motion vector prediction methods are studied by splitting a large CU into sub-CUs and deriving motion information for all the sub-CUs of the large CU. Advanced temporal motion vector prediction (ATMVP) method allows each CU to fetch multiple sets of motion information from multiple blocks smaller than the current CU in the collocated reference picture. In a spatial-temporal motion vector prediction (STMVP) method, motion vectors of the sub-CUs are derived recursively by using the temporal motion vector predictor and spatial neighbouring motion vector.

Frame-Rate Up Conversion (FRUC)

Pattern matched motion vector derivation (PMMVD) mode is a special merge mode based on Frame-Rate Up Conversion (FRUC) techniques. At the encoder side, the decision on whether to use FRUC merge mode for a CU is based on RD cost selection as done for normal merge candidate. That is, the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with Skip/Merge mode.

Deblocking Filter

Figure 10:
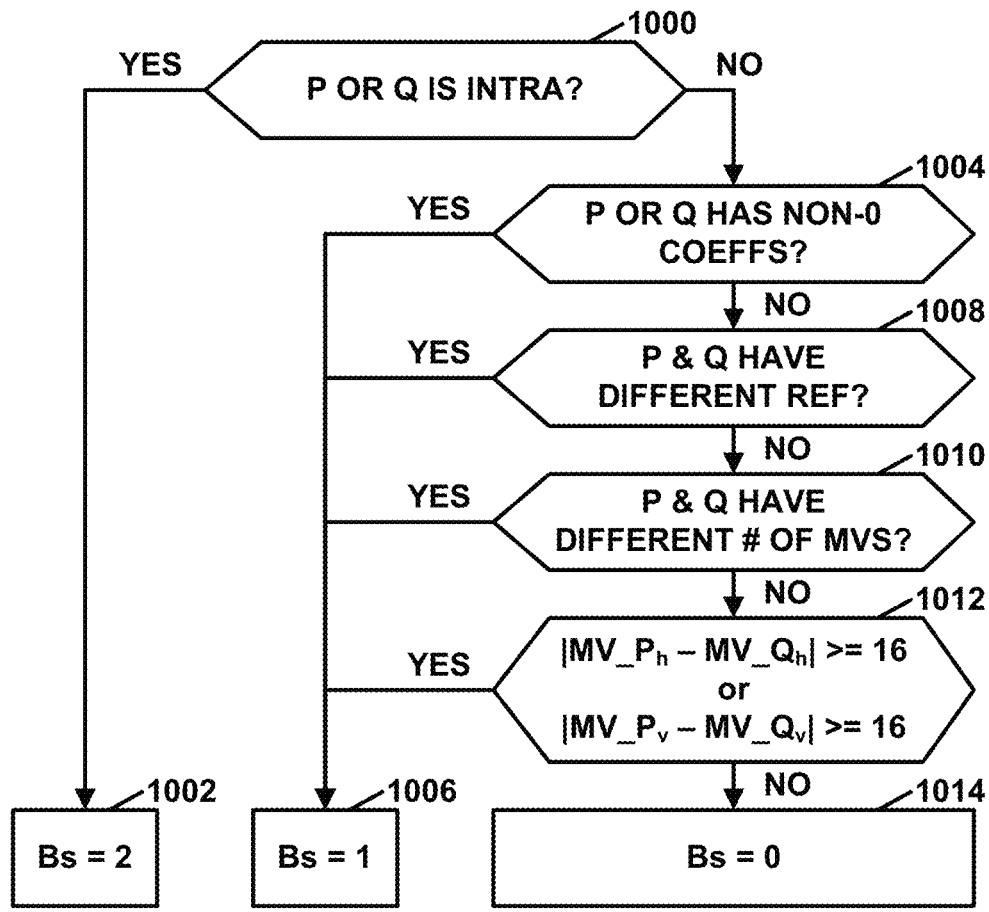
FIG. 10 is a flow diagram illustrating an example Bs decision in the Joint Exploration Model (JEM).

Compared to the HEVC deblock filtering, two main changes are applied in JEM:
1) For luma components, samples on CU (PU/TU) boundaries may be filtered regardless they are on 8×8 grids or not
2) Since the MV storage accuracy is increased from 4 to 16, the check of MV differences is changed from >=4 to >=16 (still within one integer pixel difference), as depicted in FIG. 10.

FIG. 10 is a flow diagram illustrating an example Bs decision in the JEM. As shown in FIG. 10, a video coder (e.g., video encoder 20 or video decoder 30), may determine whether either P or Q is an intra block (1000). In other words, the video coder may determine whether either P or Q was generated using intra prediction. If either P or Q is an intra block ("YES" branch of 1000), the video coder determines the Bs is equal to 2 (1002). Otherwise, if neither P or Q is an intra block ("NO" branch of 1000), the video coder may determine whether P or Q has one or more non-zero coefficients (1004). If P or Q has one or more non-zero coefficients ("YES" branch of 1004), the video coder may determine that the Bs is equal to 1 (1006). If neither P nor Q has any non-zero coefficients ("NO" branch of 1004), the video coder may determine whether P and Q have different reference pictures (1008). If P and Q have different reference pictures ("YES" branch of 1008), the video coder may determine that Bs is equal to 1 (1006). If P and Q do not have different reference pictures (i.e., P and Q have the same reference picture) ("NO" branch of 1008), the video coder may determine whether P and Q have different numbers of motion vectors (1010). If P and Q have different numbers of motion vectors ("YES" branch of 1010), the video coder may determine that Bs is equal to 1 (1006). If P and Q do not have different numbers of motion vectors (i.e., P and Q have the same number of motion vectors) ("NO" branch of 1010), the video coder may determine whether an absolute value of a difference between a first motion vector of P (i.e., $MV\_P_h$) and a first motion vector of Q (i.e., $MV\_Q_h$) is greater than or equal to 16 or an absolute value of a difference between a second motion vector of P (i.e., $MV\_P_v$) and a second motion vector of Q (i.e., $MV\_Q_v$) is greater than or equal to 16 (1012). If so ("YES" branch of 1012), the video coder may determine that Bs is equal to 1 (1006). Otherwise ("NO" branch of 1012), the video coder may determine that Bs is equal to 0 (1014).

The design of HEVC/JEM deblocking filter (DF) may have the following potential issues:

First, video content may have local diversities and rich edges along different directions. However, the current DF only filters samples along the horizontal or vertical boundary of CUs (or CU boundaries on certain grids, such as 8×8 grids). Samples along certain diagonal edges may be wrongly filtered according to the design for filtering horizontal/vertical edges. For example, if a pixel at a block boundary is actually part of a diagonal edge of an object, more accurate deblocking may be accomplished by filtering the pixel based on other pixels lying in the same diagonal, as opposed to pixels that are directly above or below, or directly left or right of the pixel.

Second, the parameters used in the DF may be efficient when there are no other in-loop filtering methods. However, when more in-loop filtering methods are applied after DF, especially when adaptive loop filter (ALF) is enabled, the interaction between DF and ALF has not been studied yet.

Third, when a coding tool results in multiple sets of motion information within one block (e.g., PU in JEM), a deblocking filter as used in HEVC/JEM typically is kept unchanged. However, the current HEVC/JEM design may lose the chance to filter boundaries of the sub-PUs since it was assumed in HEVC that the blocks inside one PU, if they are in the same TU, are motion compensated from a whole block of one single picture, therefore no blocking artifacts are expected to be removed.

Fourth, in the HEVC reference software, the encoder decides CU mode and CU partition by optimizing rate-distortion cost. However, the distortion value may be calculated by the difference of the values of unfiltered reconstructed pixels and the original pixels.

Fifth, a 1-dimensional filter is applied in the current DF, which may be sub-optimal because actual edge direction may be not aligned with the filtering direction.

This disclosure describes techniques to address the above concerns. Some of the techniques of this disclosure may be combined. The proposed techniques of this disclosure may be applied to other in-loop filtering methods which depend on certain known information to implicitly derive adaptive filter parameters, or filters with explicit signaling of parameters. For ease of explanation, this disclosure describes groups of techniques in terms of aspects. Techniques of various aspects may be used together or separately.

In a first aspect of this disclosure, in addition to filtering horizontal and vertical edges of a CU or PU or TU, a video coder (e.g., video encoder 20 or video decoder 30 may filter multiple edges (or one of the multiple edges). The techniques for filtering multiple edges may be applied to one or more certain color components (e.g., only Luma component) or certain coding block sizes.

The multiple edges may include, but are not necessarily limited to, directional edges (e.g., 45-degree diagonal edges, 135-degree diagonal edges), and non-directional edges (e.g., horizontal edges, and vertical edges). Thus, in some examples, a video coder (e.g., video encoder 20 or video decoder 30) may generate a first block of video data and a second block of the video data. In such examples, the video coder may apply a deblocking filter to samples of the first block and a second block along a directional edge, wherein the directional edge is not horizontal or vertical.

When a directional edge is used, the definitions of the P and Q blocks are modified accordingly. Examples of P and Q blocks for 45-degree and 135-degree crossing vertical edge/horizontal edge is given in FIG. 11B and FIG. 11C, respectively. The P block contains samples denoted by $Pi_j$ and the Q block contains samples denoted by $Qi_j$ (with i being 0 . . . 3 and j being 0 . . . 3). It is noted that the coordinator of top-left sample $q0_0$ within current Q block relative to the picture/slice is the same for all kinds of edges. The coordinator is a position. In this example, for the Q block, regardless the edge direction, $q0_0$ is kept unchanged.

Figure 11A:
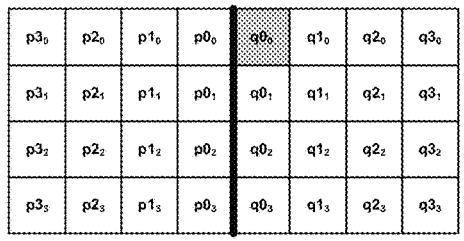
FIG. 11A illustrates examples of P and Q for a vertical boundary.
Figure 11B:
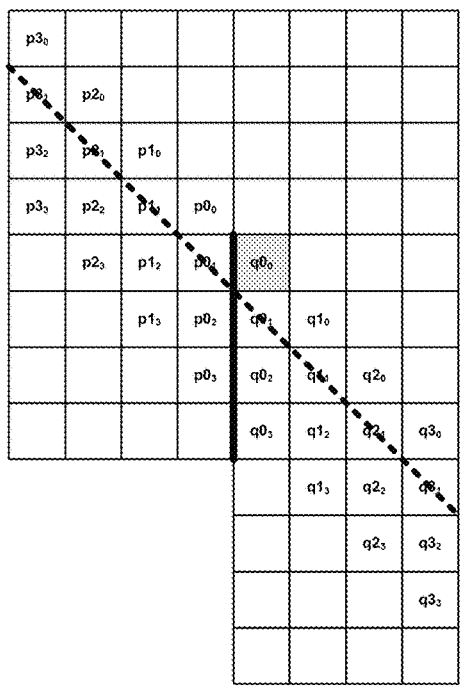
FIG. 11B illustrates examples of P and Q for a 45-degree diagonal edge crossing vertical edge.
Figure 11C:
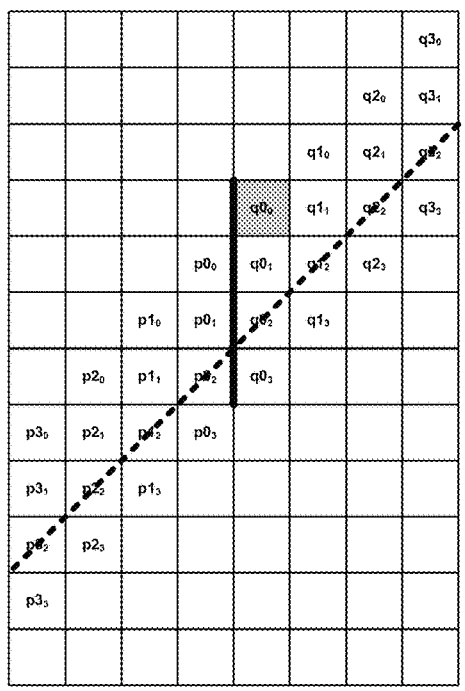
FIG. 11C illustrates examples of P and Q for a 135-degree diagonal edge crossing vertical edge.

FIGS. 11A, 11B, and 11C illustrate examples of P and Q blocks for different edges. Particularly, FIG. 11A illustrates examples of P and Q for a vertical boundary. FIG. 11B illustrates examples of P and Q for a 45-degree diagonal edge crossing vertical edge. FIG. 11C illustrates examples of P and Q for a 135-degree diagonal edge crossing vertical edge.

In some examples, when one directional edge is to be filtered, the P and Q blocks are transformed or rotated according to a direction to identify the samples to be used to decide whether to apply a weak or strong filter, and to decide how many samples per line per block are to be filtered. For instance, in the example of FIG. 11B and FIG. 11C, a video coder may use the processes described elsewhere in this disclosure for determining whether to apply a strong or weak filter, except using the pixels as labeled in FIG. 11B or FIG. 11C instead of FIG. 11A.

In some examples, for directional/non-directional edges, different filter coefficients/filter taps/parameters (e.g., $\beta$, $t_C$) may be utilized. For example, a video coder may use a 2-tap filter for directional edges and a 3-tap filter for non-directional edges. In some examples, a video coder may use a first set of filter coefficients for directional edges and a second, different set of filter coefficients for non-directional edges. In some examples, a video coder may use a first set of parameters (e.g., $\beta$, $t_C$) for directional edges and a second, different set of filter coefficients for non-directional edges.

In some examples, a video coder applies multiple passes of filtering processes. For each pass, a video coder selects only one directional edge from an edge candidate list which includes both directional/non-directional edges. In one example, the two-pass filtering (first vertical edges then horizontal edges) in the HEVC design is kept. In other words, a video coder may apply a deblocking filter to vertical edges first and then may apply a deblocking filter to horizontal edges second, if needed. However, in this example, for each pass, one of the edges including directional edges may be pre-selected. That is, the order of edges to be filtered for each pass may be pre-defined without any signaling. In some examples, a video coder applies multiple passes of filtering processes, wherein the video coder filters directional and non-directional edges separately. In one example, the first two passes are the same as in the HEVC design. However, in this example, the video coder may, in addition, further apply the filtering of one or more directional edges. In some examples, for a diagonal edge (i.e., a directional edge) to be filtered, this disclosure proposes that only samples located within a current CU or CTU or slice or tile may be used for filtering other samples or may be filtered.

For different components, the same or different filtering directions may be applied. For example, the components Cb/Cr (i.e., the chroma components) may share the same filtering directions as the component Y (i.e., the luma component). In some examples, when all three color components should filter the same edge direction, the filtering direction can be determined by the component Y only, or determined by considering all components. In another example, the component Cb/Cr may apply its own procedure to determine its own filtering direction, which may be different from the filtering direction of component Y.

In some examples, for each pass of a deblocking filtering process, one or more edges may be listed as candidates and all the allowed edges to be filtered for each pass are added to an edge candidate list. The edge candidate list may be different for different passes or may be dependent on the color component. In one example, for the first pass, vertical edges and directional edges are added to the edge candidate list while for the second pass, horizontal edges and directional edges are added to the edge candidate list. If more than one edge is included in the edge candidate list, a rule may be defined to select one of the edges for filtering process.

In one example, for each edge, a video coder calculates the sum of absolute differences along the edge direction between samples located in the Q and P blocks, denoted by grad. The video coder selects the edge which provides the minimum value of grad to be the edge to be filtered. An example for using 4 lines to calculate the grad value is given as follows:

$$\text{grad}=\Sigma_{y=0}^{3}\text{abs}(p0_y-q0_y)$$

In one example, $p0_y$, $q0_y$ are defined as the samples along the edge direction. In one example, an edge candidate list for the first pass includes a 45-degree edge and a 90-degree edge (vertical boundary), and another edge candidate list for the second pass includes edge candidate list for the first pass includes a 135-degree edge and 0-degree edge (horizontal boundary).

In one example, for each edge, a video coder calculates the sum of 1-D Laplacian between samples located in the Q and/or P blocks, denoted by grad. The video coder selects the edge which provides the minimum value of grad to be the edge to be filtered. An example for using four lines in both the P and Q blocks to calculate the grad value is given as follows:

$$\text{grad}=\Sigma_{y=0}^{3}\text{abs}((p1_y<<1)-p0_y-p2_y)+\text{abs}((q1_y<<1)-q0_y-q2_y)$$

Another example for using four lines in the Q block to calculate the grad value is given as follows:

$$\text{grad}=\Sigma_{y=0}^{3}\text{abs}((q1_y<<1)-q0_y-q2_y)$$

In some examples, when a directional edge provides the minimum value of grad, a video coder may further apply a threshold or scaling factor. That is, the video coder may select the directional edge from the edge candidate list only when the grad of the directional edge plus the threshold (or scaled by the scaling factor) is also smaller than the grad of the non-directional edge in the edge candidate list. Otherwise, the video coder selects the non-directional edge from the edge candidate list.

In one example, a video coder may only use samples within a current CU, current LCU, current tile, or current slice to decide the edge to be filtered from the edge candidate list. In one example, if a sample is belonging to a different CU or LCU/tile/slice, it is not used in the edge decision process, such as in the calculation of grad process. In some examples, a video coder may use samples outside the P and Q blocks to decide the edge to be filtered.

In one example, edge decisions (i.e., direction decisions) and filtering decisions (strong/weak, how many samples) may be performed in different granularity. In one example, a filtering decision is based on one or more lines within P and/or Q blocks while a direction decision is based on larger blocks (e.g., 8 lines) covering P and/or Q and all blocks within the larger block share the same filtering direction.

In one example, the filtering directions are derived at both video encoder 20 and video decoder 30 in the same way. In another example, the filtering directions are derived at video encoder 20, and signaled to video decoder 30, at a sequence level, a picture level, a slice level, a tile level, an LCU level, a CU level, a PU level, or a TU level.

In one example, the filtering method rolls back to the non-directional method as in HEVC in some conditions. The conditions may include, but are not necessarily limited to, one or more of: a QP is larger or lower than a threshold; a gradient value (e.g., grad as calculated above) is larger or lower than a threshold; a motion vector is larger or lower than a threshold; a block size is larger or lower than a threshold; a width and/or height of the block is larger or lower than a threshold.

In one example, for a horizontal edge or a directional edge crossing the horizontal edge, the P and Q blocks that a video coder uses to determine the value of Bs may be the same, i.e., the current block (Q) and the above block (P). In some examples, for a vertical edge or a directional edge crossing the vertical edge, the P and Q blocks that a video coder uses to determine the value of Bs may be the same, i.e., the current block (Q) and the left block (P). In some examples, P and Q are always selected according to the edge direction.

In a second aspect of this disclosure, instead of applying a 1-dimension filter in DF, a video coder may apply 2-dimensional (2D) filters. A 2-dimensional filter may determine a value of a filtered sample based on values of samples above/below and left/right of the filtered sample. In some examples, multiple sets of 2-D filters may be pre-defined or signaled in the bitstream. Furthermore, in some examples, a video coder may apply any of the aforementioned filter edge detection processes described with respect to the first aspect of this disclosure. Marta Karczewicz, Li Zhang, Wei-Jung Chien, Xiang Li, "Geometry Transformation-based Adaptive In-Loop Filter," IEEE PCS 2016, describes Geometry Transformation-based Adaptive In-Loop Filtering (GALF). A video coder may further apply geometry transformation as in GALF to perform the filtering process.

In a third aspect of this disclosure, a video coder may perform a deblocking filter process directly after a CU is decoded and reconstructed (instead of after a slice is decoded and reconstructed). In accordance with one technique of this disclosure, the video coder filters pixels in a CU after the video coder has decoded and reconstructed the CU. To reconstruct the next CU, a reconstruction process of the video coder can access the filtered pixel values and/or the un-filtered values in the previously-decoded CUs.

When multiple-edge DF is applied, if the samples used in direction decision/filter decision/filtering process is not available (e.g., have not been decoded yet, outside of the same slice/CTU row), the following techniques may apply:
1) The closest available samples may be used to pad the unavailable ones.
2) The closest available samples along the direction may be used to pad the unavailable ones.
3) Filters (e.g., filter tap, filtering direction) may be adaptively selected according to the available samples. That is, for different lines, the filters may be different even with the same selected edge direction.
4) Filtering for certain samples may be disabled if the neighboring samples are unavailable.

In a fourth aspect of this disclosure, for two neighboring blocks that cover a boundary to be filtered (such as P and Q in FIG. 8), a video coder may use different sets of parameters used in a deblocking filter process (e.g., $t_C$ and β) to determine whether to filter or not, and/or to decide how many samples are to be filtered, and/or to decide which kind of filter is to be applied. In one example, when determining whether two pixels or 1 pixel nearest to the boundary of the block P or Q, different parameters (β0 and β1) are used instead of just using one parameter β:

If dp0+dp3<(β0+(β0>>1))>>3, the variable dEp1 is set equal to 1, the two nearest pixels to the block boundary can be modified in block P.

If dq0+dq3<(β1+(β1>>1))>>3, the variable dEq1 is set equal to 1, the two nearest pixels to the block boundary can be modified in block Q.

In one example, the video coder may select, for each block, one set of parameters depending on the coded mode information (intra or inter modes). In one example, the video coder may select, for each block, one set of parameters depending on whether a CBF value associated with the block is equal to 1 or 0. In one example, the video coder may select, for each block, one set of parameters depending on other information, such as transform type, prediction direction, motion information, etc.

In examples in which multiple sets of parameters may be used, a video coder may apply the processes described in the following examples to derive the multiple sets of parameters. In one example, the multiple sets of parameters may be predefined via multiple sets of look-up tables. In this example, each look-up table defines the relationship between deblocking filter parameters (e.g., β and $t_C$) and the quantization parameter. Table 1, above, is one example of a look-up table, wherein the parameters (e.g., β and $t_C$) can be derived from the look-up table with a given quantization parameter as the input. In another example, one look-up table (e.g., Table 1) is used while the derivation of the input parameter Q may be different according to the selection rule of parameter set. For example, the look-up table (e.g., Table 1) is utilized, while for final parameters (e.g., β and $t_C$) are derived as follows:

The variable β is derived from β' as follows:

$$\beta=\beta'*(1<<(BitDepth_Y-8))+(Intra\ blocks?\ 2:0)$$

The variable $t_C$ is derived from $t_C$' as follows:

$$t_C=t_C'*(1<<(BitDepth_Y-8))+(Intra\ blocks?\ 2:0)$$

In some examples, multiple sets of syntax elements (e.g., slice_beta_offset_div2 and/or slice_tc_offset_div2) may be signaled or derived and used to determine the sets of parameters.

As mentioned above, video encoder 20 may signal default deblocking parameter offsets for β and $t_C$ (e.g., using pps_beta_offset_div2, pps_tc_offset_div2, slice_beta_offset_div2, and/or slice_tc_offset_div2 syntax elements). A video coder may use the default deblocking parameter offsets to determine values of Q that the video coder may then use to look up values of β and $t_C$ in a lookup table, such as Table 1. In HEVC, signaling of the PPS-level default deblocking parameter offsets is dependent on whether deblocking filters are enabled in slices referring to a PPS. Furthermore, in HEVC, signaling of slice-level default deblocking parameter offsets is dependent on whether deblocking filters are enabled for an individual slice segment.

In some examples of the fourth aspect of this disclosure, one or more default offset values of deblocking parameters may be predefined or signaled, which may depend on the enabling/disabling of other in-loop filters, such as ALF. Thus, rather than being dependent on deblocking filters being enabled, signaling of default deblocking parameter offsets may instead or additionally be dependent on whether other types of in-loop filters are enabled or disabled. In one example, when ALF is disabled, the default offset value of slice_beta_offset_div2 and/or slice_tc_offset_div2 is set to 0. In one example, when ALF is disabled, the default offset value of slice_beta_offset_div2 and/or slice_tc_offset_div2 is set to −2. In one example, when ALF is enabled, the default offset value of slice_beta_offset_div2 and/or slice_tc_offset_div2 may be set to a non-zero value. The non-zero values may be predefined or signaled. The non-zero values may be different per slice type or based on CU mode of a block. In some examples, furthermore, the default deblocking parameter offsets are dependent on a slice type and/or a low delay check. The low delay check may check a value of a flag, such as the NoBackwardPredFlag in the HEVC specification, which indicates whether all reference pictures for one slice in current picture are associated with Picture Order Count (POC) values larger or equal to the POC value of current picture). For instance, the default offset value of slice_tc_offset_div2 for I and B/P slices may be set to −6 and −4, respectively.

In accordance with a fifth aspect of this disclosure, in addition to CU/PU/TU boundaries, a video coder (e.g., video encoder 20 or video decoder 30) may also filter sub-PU (or named as sub-CU) boundaries when one block is split into multiple sub-PUs and each sub-PU has its own motion information. Thus, in one example, a video coder may generate, based on motion information of a first sub-PU of a PU of a CU, a predictive block for the first sub-PU. In this example, the video coder may generate, based on motion information of a second sub-PU of the PU, a predictive block for the second sub-PU. In this example, the CU may have one or more PUs. Furthermore, in this example, the video coder may apply a deblocking filter to samples of the predictive block for the first sub-PU and the predictive block for the second sub-PU at a boundary between the first sub-PU and the second sub-PU. This disclosure may refer to boundaries that are between sub-PUs, but not between CUs, PUs, or TUs as "inner boundaries."

Furthermore, in some examples of the fifth aspect of this disclosure, when one block is coded with an ATMVP mode, a STMVP mode, or FRUC bilateral matching, a video coder may filter sub-PU boundaries, wherein the block is coded with multiple sub-PUs. In some examples, the video coder determines the Bs value associated with an inner boundary by purely checking the motion information of the sub-PUs on either side of the inner boundary. In one example, the techniques proposed for applying deblocking filters to inner boundaries may only be applied to the luma component, or to certain CU sizes. For instance, if the size of a CU is below a particular threshold, a video coder does not apply a deblocking filter to inner boundaries between sub-PUs of the CU. Furthermore, in some examples, when the CBF of a current CU, PU, or TU is equal to 1 (i.e., there is at least one non-zero coefficients in the current CU, PU, or TU), the filtering of sub-PU boundaries is always disabled.

In one example of with the fifth aspect of this disclosure, the filtering for inner boundaries may be applied to certain color components (e.g., only Luma component), and/or to certain block sizes and not others, and/or certain types of pictures (e.g., pictures which may be further used as reference pictures) and not other type of pictures.

In some examples of the fifth aspect of this disclosure, when an overlapped transform is applied (i.e., when one TU contains one or more CUs/PUs), application of a deblocking filter to CU/PU boundaries excepting the TU boundary is always disabled when there is more than one non-zero coefficient in the TU. In this case, those CU or PU boundaries excepting the TU boundary may be also considered as inner boundaries.

Additionally, in some examples of the fifth aspect of this disclosure, CU, PU, or TU boundaries and inner boundaries may use different filters. For example, a video coder may apply weaker filters for inner boundaries than for CU, PU, or TU boundaries.

A sixth aspect of this disclosure relates to the use of deblocking-filtered pixels in determining coding modes. As mentioned above, in the HEVC reference software, a video encoder decides a CU mode and a CU partitioning mode (e.g., how to split a CTU into multiple CUs/TUs/PUs) by optimizing a rate-distortion cost. In other words, the video encoder may determine whether to encode a CU using inter prediction or inter prediction based on a rate-distortion cost and may also determine how to partition a CTU into CUs based on the rate-distortion cost. Example types of CU partitioning modes may include quad-tree based splitting modes, binary tree based splitting modes or triple-tree based splitting modes or no further splitting. Furthermore, example partitioning modes may include symmetric splitting modes or asymmetric splitting modes or no further splitting.

The video encoder may calculate the rate-distortion cost as:

$$J=D+\lambda R$$

In the equation above, J is the rate-distortion cost, D is a distortion value, R is a rate value indicating a number of bits used in an encoded representation of a CU, and λ is a Lagrange multiplier. The distortion value is a metric of differences between a decoded version of the CU and an original version of the CU. In some examples, video encoder 20 may calculate the distortion value is a mean squared error (MSE). Video encoder 20 may calculate the MSE as:

$$MSE = \frac{1}{n}\sum_{i=1}^{n}(Y_i - \hat{Y}_i)^2$$

In the equation above, n denotes the number of pixels in the current block, Y is a vector of original pixels of the current block, and $\hat{Y}$ is a vector of reconstructed pixels. In the HEVC reference software, the distortion value is calculated based on the difference of the values of unfiltered reconstructed pixels and the original pixels.

In accordance with a technique of this disclosure, instead of using the unfiltered reconstructed pixel values, video encoder 20 may calculate the distortion value based on the values of deblocking-filtered reconstructed pixels and the original pixels. For instance, video encoder 20 may calculate the distortion value based on the difference of the values of the deblocking-filtered reconstructed pixels and the original pixels. This can provide more accurate distortion information, much may result in improved performance.

Thus, in one example in accordance with a technique of this disclosure, video encoder 20 reconstructs pixels. For instance, video encoder 20 may reconstruct samples in coding blocks of a CU. Furthermore, in this example, video encoder 20 may apply a deblocking filter to the reconstructed pixels to derive deblocking-filtered reconstructed pixels. For instance, video encoder 20 may apply a deblocking filter as described in any of the examples provided elsewhere in this disclosure. Furthermore, video encoder 20 may calculate one or more distortion values based on values of the deblocking-filtered reconstructed pixels and original pixels (e.g., the difference of such values). Video encoder 20 may select an encoding mode based on the calculated distortion values. For example, video encoder 20 may determine whether to include, in a bitstream, an inter predicted version of a CU or an intra predicted version of the CU.

In some examples of the sixth aspect of this disclosure, when an encoder calculates the distortion value by the values of deblocking-filtered reconstructed pixels and the original pixels, video encoder 20 considers only a portion of the deblocking-filtered pixels for the rate-distortion (RD) costs calculation. In one example, video encoder 20 considers only the distortion of the pixels within a current block (e.g., a CU, a PU or a TU) for the rate-distortion (RD) costs calculation. The distortion of the pixels outside the current block is not calculated to simplify the RD calculations.

For example, application of a deblocking filter to an edge of a block may modify the values of samples on the other side of the edge in a different block. However, when calculating the RD costs associated with different partitioning modes (e.g., CTU splitting structure) of the block or different CU modes of the block, video encoder 20 does not take into consideration distortion created by modifying the values of the samples on the other side of the edge. This is because it may be inefficient for video encoder 20 to go back and change the partitioning modes or CU modes of blocks previously encoded by video encoder 20.

In some examples, when video encoder 20 applies multiple-edge DF, if one or more samples used in a direction decision process, filter decision process, or filtering process are not available (e.g., video encoder 20 has not yet decoded the samples, the samples are outside of the same slice or CTU row, or the samples are otherwise not available), video encoder 20 may apply the following methods:

1) The original samples are used to replace those unavailable ones.
2) The closest available samples may be used to pad the unavailable ones.
3) The closest available samples along the direction may be used to pad the unavailable ones.
4) Filters (e.g., filter tap) may be adaptively selected according to the available samples. For instance, the video coder may use fewer taps in the deblocking filter so as to avoid filtering based on unavailable samples.
5) The video coder may disable filtering for certain samples if the neighboring samples are unavailable.

Figure 12:
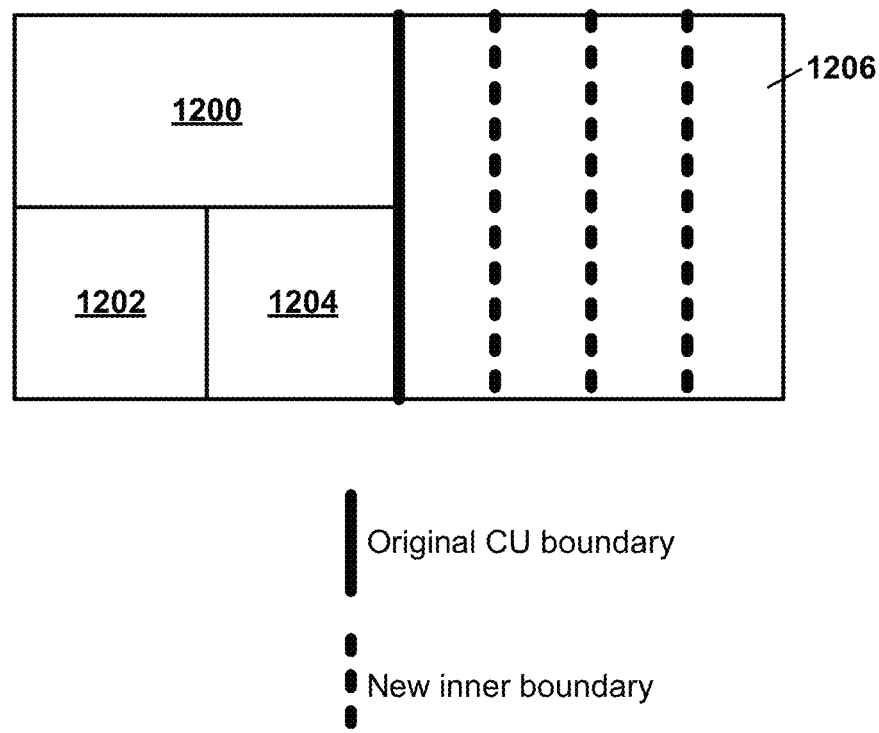
FIG. 12 illustrates an example of deblocking filtering applied to inner-boundary for vertical edges, in accordance with one or more techniques of this disclosure.

In accordance with examples of the fifth aspect of this disclosure, when one CU is coded with a coding tool which splits one CU into multiple sub-PUs and each of the sub-PUs may have its own motion information, the sub-PU boundaries (excluding those that are part of CU boundaries) are defined as the inner boundaries. FIG. 12 illustrates an example of deblocking filtering applied to inner-boundary for vertical edges, in accordance with one or more techniques of this disclosure. The example of FIG. 12 shows four CUs 1200, 1202, 1204, and 1206. CU 1206 has one or more PUs and is further partitioned into four sub-PUs. Boundaries between the four sub-PUs are shown in FIG. 12 as dashed lines.

Figure 13:
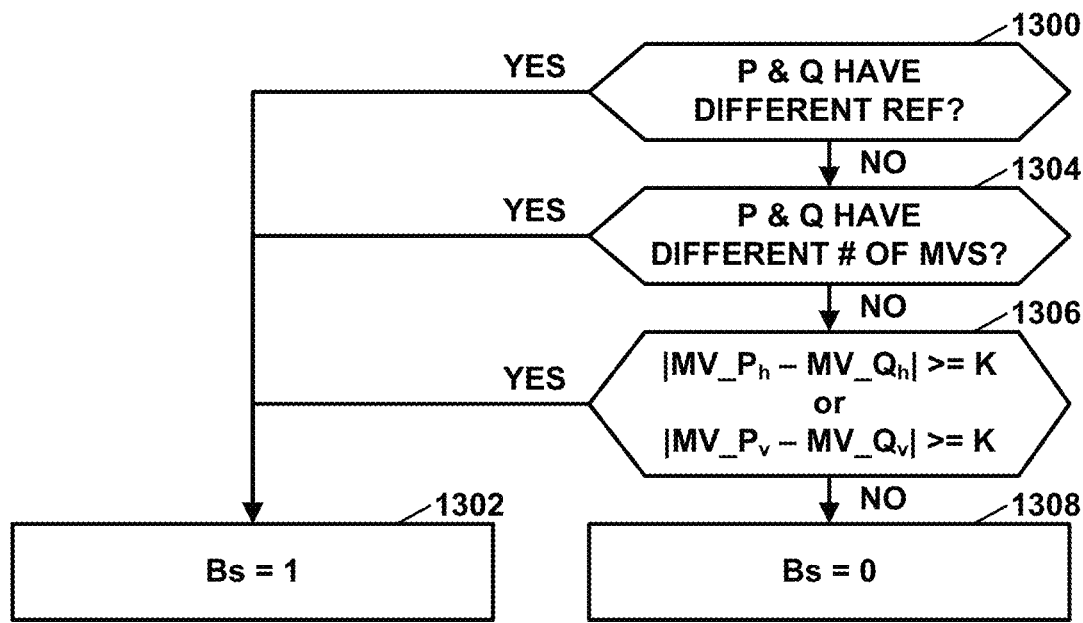
FIG. 13 is an example flow diagram for Bs calculation for inner boundaries, in accordance with one or more techniques of this disclosure.

In one example, the check for inner boundaries (boundaries of sub-PUs) and CU boundaries are given as follows: For CU boundaries, when both P and Q are available, a video coder may use the same operations as HEVC/JEM (which are depicted in FIG. 7 and FIG. 10) to determine the value of Bs. For inner boundaries, in one example, the video coder only considers motion information of P and Q to determine the value of Bs. FIG. 13 illustrates one example operation for determining the value of Bs only using the motion information of P and Q. Thus, FIG. 13 is an example flow diagram for Bs calculation for inner boundaries, in accordance with one or more techniques of this disclosure.

In the example of FIG. 13, a video coder (e.g., video encoder 20 or video decoder 30) may determine whether P and Q have different reference pictures (1300). In response to determining that P and Q have different reference pictures ("YES" branch of 1300), the video coder may set Bs equal to 1 (1302). Otherwise, in response to determining that P and Q do not have different reference pictures ("NO" branch of 1300), the video coder determines whether P and Q have different numbers of motion vectors (1304). In response to determining that P and Q have different numbers of motion vectors ("YES" branch of 1304), the video coder may set Bs equal to 1 (1302). In response to determining that P and Q do not have different numbers of motion vectors ("NO" branch of 1304), the video coder may determine whether an absolute value of a difference between a first motion vector of P (i.e., $MV\_P_h$) and a first motion vector of Q (i.e., $MV\_Q_h$) is greater than or equal to a value K or an absolute value of a difference between a second motion vector of P (i.e., $MV\_P_v$) and a second motion vector of Q (i.e., $MV\_Q_v$) is greater than or equal to K (1306). If so ("YES" branch of 1306), the video coder may determine that Bs is equal to 1 (1302). Otherwise ("NO" branch of 1306), the video coder may determine that Bs is equal to 0 (1308).

In some examples, the video coder first checks the CBF of the current block. In such examples, if the CBF of the current block is equal to 1 (i.e., at least one non-zero coefficients within current CU), the video coder directly sets Bs is to 0, that is, no filtering is applied. In some examples, when a video coder cannot filter a CU boundary because one or more neighboring blocks are missing or unavailable (such as when a CU vertical boundary is part of a slice or picture boundary), the filtering of inner boundaries along the filter direction is also disallowed. That is, Bs is always set to 0, which may mean that no filtering is applied.

Multiple Sets of Parameters

As described above with respect to the fourth aspect of this disclosure, different sets of parameters may be used in a deblocking process for neighboring blocks P and Q. Examples in accordance with the fourth aspect of this disclosure may be implemented in various ways. For instance, in a first example implementation of the fourth aspect of this disclosure, multiple sets of parameters used in deblocking filter according to the ALF on/off flags are defined as follows. Changes to Joshi et al., "High Efficiency Video Coding (HEVC) Screen Content Coding: Draft 6," Joint Collaborative Team on Video Coding (JCT-VC) of ITU-T SG 16 WP 3 and ISO/IEC JTC 1/SC 29/WG 11, 23$^{rd}$ Meeting: San Diego, USA, 19-26 Feb. 2016, document JCTVC-W1005 (hereinafter, "JCTVC-W1005") to implement this example are indicated below. Particularly, changes to JCTVC-W1005 are indicated between <CHANGE> </CHANGE> tags (e.g., <CHANGE> . . . </CHANGE>"). In JCTVC-W1005, Table 1, above, is referred to as Table 8-12.

8.7.2.5.3 Decision Process for Luma Block Edges

Inputs to this process are:
- a luma picture sample array recPicture$_L$,
- a luma location (xCb, yCb) specifying the top-left sample of the current luma coding block relative to the top-left luma sample of the current picture,
- a luma location (xB1, yB1) specifying the top-left sample of the current luma block relative to the top-left sample of the current luma coding block,
- a variable edgeType specifying whether a vertical (EDGE_VER) or a horizontal (EDGE_HOR) edge is filtered,
- a variable bS specifying the boundary filtering strength.

Outputs of this process are:
- the variables dE, dEp, and dEq containing decisions,
- the variables $\beta$ and $t_C$.

If edgeType is equal to EDGE_VER, the sample values $p_{i,k}$ and $q_{i,k}$ with i=0 . . . 3 and k=0 and 3 are derived as follows:

$$q_{i,k}=\text{recPicture}_L[xCb+xB1+i][yCb+yB1+k] \quad (8\text{-}345)$$

$$p_{i,k}=\text{recPicture}_L[xCb+xB1-i-1][yCb+yB1+k] \quad (8\text{-}346)$$

Otherwise (edgeType is equal to EDGE_HOR), the sample values $p_{i,k}$ and $q_{i,k}$ with i=0 . . . 3 and k=0 and 3 are derived as follows:

$$q_{i,k}=\text{recPicture}_L[xCb+xB1+k][yCb+yB1+i] \quad (8\text{-}347)$$

$$p_{i,k}=\text{recPicture}_L[xCb+xB1+k][yCb+yB1-i-1] \quad (8\text{-}348)$$

The variables Qp$_Q$ and Qp$_P$ are set equal to the Qp$_Y$ values of the coding units which include the coding blocks containing the sample $q_{0,0}$ and $p_{0,0}$, respectively.

The variable qP$_L$ is derived as follows:

$$qP_L=((Qp_Q+Qp_P+1)>>1) \quad (8\text{-}349)$$

The value of the variable $\beta'$ is determined as specified in Table 8-12 based on the luma quantization parameter Q derived as follows:

$$Q=\text{Clip3}(0,51,qP_L+(\text{slice\_beta\_offset\_div2}<<1)) \quad (8\text{-}350)$$

where slice_beta_offset_div2 is the value of the syntax element slice_beta_offset_div2 for the slice that contains sample $q_{0,0}$.

The variable $\beta$ is derived as follows:

$$\beta=\beta'*(1<<(\text{BitDepth}_Y-8)) \quad (8\text{-}351)$$

The value of the variable $t_C'$ is determined as specified in Table 8-12 based on the luma quantization parameter Q derived as follows:

$$Q=\text{Clip3}(0,53,qP_L+2*(bS-1)+ \\ (\text{slice\_tc\_offset\_div2}<\text{CHANGE}>+ \\ \text{default\_tc\_offset}</\text{CHANGE}>)<<1)) \quad (8\text{-}352)$$

where slice_tc_offset_div2 is the value of the syntax element slice_tc_offset_div2 for the slice that contains sample $q_{0,0}$.

The variable $t_C$ is derived as follows:

$$t_C=t_C'*(1<<(\text{BitDepth}_Y-8)) \quad (8\text{-}353)$$

<CHANGE>default_tc_offset</CHANGE> is set to 0 when ALF is disabled for current slice, −6 when ALF is enabled and current slice is an I slice, −4 when ALF is enabled and current slice is a P or B slice.

Alternatively, the following may be used to replace the equation (8-352):

$$Q=\text{Clip3}(0,53,qP_L+2*(bS-1)<\text{CHANGE}>+ \\ \text{default\_tc\_offset}</\text{CHANGE}>+(\text{slice\_tc\_} \\ \text{offset\_div2})<<1)) \quad (8\text{-}352)$$

In accordance with the first example implementation of the fourth aspect of this disclosure, in one example, video encoder 20 may set a default offset value (e.g., default_tc_offset). Video encoder 20 sets the default offset value to a first value (e.g., 0) when Adaptive Loop Filtering (ALF) is disabled for a current slice, a second value (e.g., −6) when ALF is enabled for the current slice and the current slice is an I slice, and a third value (e.g., −4) when ALF is enabled for the current slice and the current slice is a P or B slice. Furthermore, video encoder 20 may determine, based on the default offset value, deblocking filter parameters (e.g., as shown in either version of equation 8-352 shown above, Table 8-12, equation 8-353). Video encoder 20 may also determine, based on the deblocking filter parameters, a deblocking filter. Video encoder 20 may apply the determined deblocking filter to samples of the current slice. In some instances, video encoder 20 may determine the deblocking filter and apply the determined deblocking filter in the manner described in sections above labeled, "Filter on/off decision of 4 lines," "strong/weak filter selection for 4 lines," "strong filtering," "weak filtering," and "Chroma filtering." In other examples video encoder 20 may determine and apply the deblocking filter in other ways.

Similarly, in accordance with the first example implementation of the fourth aspect of this disclosure, in one example, video decoder 30 sets a default offset value. Video decoder 30 sets the default offset value to a first value (e.g., 0) when Adaptive Loop Filtering (ALF) is disabled for a current slice, a second value (e.g., −6) when ALF is enabled for the current slice and the current slice is an I slice, and a third value (e.g., −4) when ALF is enabled for the current slice and the current slice is a P or B slice. Video decoder 30 may determine, based on the default offset value, deblocking filter parameters (e.g., as shown in either version of equation 8-352 shown above, Table 8-12, equation 8-353). Furthermore, in this example, video decoder 30 may determine, based on the deblocking filter parameters, a deblocking filter. Video decoder 30 may apply the determined deblocking filter to samples of the current slice. In some instances, video decoder 30 may determine the deblocking filter and apply the determined deblocking filter in the manner described in sections above labeled, "Filter on/off decision of 4 lines," "strong/weak filter selection for 4 lines," "strong filtering," "weak filtering," and "Chroma filtering." In other examples, video decoder 30 may determine and apply the deblocking filter in other ways.

In accordance with a second example implementation of the fourth aspect of this disclosure, slice_tc_offset_div2 in the existing HEVC specification JCTVC-W1005 can be predicted by the previous slice_tc_offset_div2 values in the previous slice with the same slice type or temporal layer.

In one example of the second implementation of the fourth aspect of this disclosure, a video coder (e.g., video encoder 20 or video decoder 30) may determine, based on an offset value of a previous slice, an offset value (e.g., slice_tc_offset_div2) of a current slice. In this example, at least one of the following applies: the previous slice and the current slice belong to a same slice type, or the previous slice and the current slice belong to a same temporal layer. Furthermore, in this example, the video coder may determine, based on the offset value of the current slice, deblocking filter parameters (e.g., $\beta$ and $t_C$). The video coder may determine the deblocking filter parameters by determining Q as shown in Equation 8-352 and using Q to look up the deblocking filter parameters in a table (e.g., Table 8-12). Additionally, in this example, the video coder may determine, based on the deblocking filter parameters, a deblocking filter. The video coder may apply the determined deblocking filter to samples of a picture of the video data. In some instances, the video coder may determine the deblocking filter and apply the determined deblocking filter in the manner described in sections above labeled, "Filter on/off decision of 4 lines," "strong/weak filter selection for 4 lines," "strong filtering," "weak filtering," and "Chroma filtering." In other examples, the video decoder may determine and apply the deblocking filter in other ways.

In accordance with a third example implementation of the fourth aspect of this disclosure, multiple sets of parameters used in a deblocking filter are defined according to the ALF on/off flags is given as follows. The changes compared to the existing HEVC specification JCTVC-W1005 to accomplish the third implementation of the fourth aspect of this disclosure are indicated below between <CHANGE></CHANGE> tags (e.g., <CHANGE> . . . </CHANGE>").

5.2.3.1.1 Decision Process for Luma Block Edges
Inputs to this process are:
  a luma picture sample array recPicture$_L$,
  a luma location (xCb, yCb) specifying the top-left sample of the current luma coding block relative to the top-left luma sample of the current picture,
  a luma location (xB1, yB1) specifying the top-left sample of the current luma block relative to the top-left sample of the current luma coding block,
  a variable edgeType specifying whether a vertical (EDGE_VER) or a horizontal (EDGE_HOR) edge is filtered,
  a variable bS specifying the boundary filtering strength.

Outputs of this process are:
  the variables dE, dEp, and dEq containing decisions,
  the variables $\beta$ and $t_C$.

If edgeType is equal to EDGE_VER, the sample values $p_{i,k}$ and $q_{i,k}$ with i=0 . . . 3 and k=0 and 3 are derived as follows:

$$q_{i,k} = \text{recPicture}_L[xCb+xB1+i][yCb+yB1+k] \quad (0\text{-}1)$$

$$p_{i,k} = \text{recPicture}_L[xCb+xB1-i-1][yCb+yB1+k] \quad (0\text{-}2)$$

Otherwise (edgeType is equal to EDGE_HOR), the sample values $p_{i,k}$ and $q_{i,k}$ with i=0 . . . 3 and k=0 and 3 are derived as follows:

$$q_{i,k} = \text{recPicture}_L[xCb+xB1+k][yCb+yB1+i] \quad (0\text{-}3)$$

$$p_{i,k} = \text{recPicture}_L[xCb+xB1+k][yCb+yB1-i-1] \quad (0\text{-}4)$$

The variables $Qp_Q$ and $Qp_P$ are set equal to the $Qp_Y$ values of the coding units which include the coding blocks containing the sample $q_{0,0}$ and $p_{0,0}$, respectively.

The variable $qP_L$ is derived as follows:

$$qP_L = ((Qp_Q + Qp_P + 1) >> 1) \quad (0\text{-}5)$$

The value of the variable $\beta'$ is determined as specified in Table 8-12 based on the luma quantization parameter Q derived as follows:

$$Q = \text{Clip3}(0, 51, qP_L + (\text{slice\_beta\_offset\_div2} << 1)) \quad (0\text{-}6)$$

where slice_beta_offset_div2 is the value of the syntax element slice_beta_offset_div2 for the slice that contains sample $q_{0,0}$.

The variable $\beta$ is derived as follows:

$$\beta = \beta' * (1 << (\text{BitDepth}_Y - 8)) \quad (8\text{-}351)$$

The value of the variable $t_C'$ is determined as specified in Table 8-12 based on the luma quantization parameter Q derived as follows:

$$Q = \text{Clip3}(0, 53, qP_L + 2*(bS-1) + (\text{slice\_tc\_offset\_div2} <\text{CHANGE}> + \text{default\_tc\_offset}</\text{CHANGE}>) << 1)) \quad (0\text{-}7)$$

where slice_tc_offset_div2 is the value of the syntax element slice_tc_offset_div2 for the slice that contains sample $q_{0,0}$.

The variable $t_C$ is derived as follows:

$$t_C = t_C' * (1 << (\text{BitDepth}_Y - 8)) \quad (0\text{-}8)$$

<CHANGE>default_tc_offset</CHANGE> is set to −2 when ALF is disabled for current slice, <CHANGE>intra_slice_tc_offset_div2</CHANGE> when ALF is enabled and current slice is an I slice, <CHANGE>inter_slice_tc_offset_div2</CHANGE> when ALF is enabled and current slice is a P or B slice.

Alternatively, the following may be used to replace the equation (8-352):

$$Q = \text{Clip3}(0, 53, qP_L + 2*(bS-1) <\text{CHANGE}> + \text{default\_tc\_offset}</\text{CHANGE}> + (\text{slice\_tc\_offset\_div2}) << 1)) \quad (0\text{-}9)$$

The following table indicates example changes to the SPS defined in JCTVC-W1005 in accordance with the third example implementation of the fourth aspect of this disclosure.

| seq_parameter_set_rbsp( ) { | Descriptor |
| --- | --- |
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |

-continued

| seq_parameter_set_rbsp( ) { | Descriptor |
|---|---|
| chroma_format_idc | ue(v) |
| if( chroma_format_idc == 3) | |
|   separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
|   conf_win_left_offset | ue(v) |
|   conf_win_right_offset | ue(v) |
|   conf_win_top_offset | ue(v) |
|   conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 ); | |
|   i <= sps_max_sub_layers_minus1; i++ ) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| log2_min_luma_coding_block_size_minus3 | ue(v) |
| log2_diff_max_min_luma_coding_block_size | ue(v) |
| log2_min_luma_transform_block_size_minus2 | ue(v) |
| log2_diff_max_min_luma_transform_block_size | ue(v) |
| max_transform_hierarchy_depth_inter | ue(v) |
| max_transform_hierarchy_depth_intra | ue(v) |
| scaling_list_enabled_flag | u(1) |
| if( scaling_list_enabled_flag ) { | |
|   sps_scaling_list_data_present_flag | u(1) |
|   if( sps_scaling_list_data_present_flag ) | |
|     scaling_list_data( ) | |
| } | |
| amp_enabled_flag | u(1) |
| sample_adaptive_offset_enabled_flag | u(1) |
| pcm_enabled_flag | u(1) |
| if( pcm_enabled_flag ) { | |
|   pcm_sample_bit_depth_luma_minus1 | u(4) |
|   pcm_sample_bit_depth_chroma_minus1 | u(4) |
|   log2_min_pcm_luma_coding_block_size_minus3 | ue(v) |
|   log2_diff_max_min_pcm_luma_coding_block_size | ue(v) |
|   pcm_loop_filter_disabled_flag | u(1) |
| } | |
| num_short_term_ref_pic_sets | ue(v) |
| for( i = 0; i < num_short_term_ref_pic_sets; i++) | |
|   st_ref_pic_set( i ) | |
| long_term_ref_pics_present_flag | u(1) |
| if( long_term_ref_pics_present_flag ) { | |
|   num_long_term_ref_pics_sps | ue(v) |
|   for( i = 0; i < num_long_term_ref_pics_sps; i++ ) { | |
|     lt_ref_pic_poc_lsb_sps[ i ] | u(v) |
|     used_by_curr_pic_lt_sps_flag[ i ] | u(1) |
|   } | |
| } | |
| sps_temporal_mvp_enabled_flag | u(1) |
| strong_intra_smoothing_enabled_flag | u(1) |
| <CHANGE>intra_slice_tc_offset_div2</CHANGE> | <CHANGE>se(v)</CHANGE> |
| <CHANGE>inter_slice_tc_offset_div2</CHANGE> | <CHANGE>se(v)</CHANGE> |
| vui_parameters_present_flag | u(1) |
| if( vui_parameters_present_flag ) | |
|   vui_parameters( ) | |
| sps_extension_present_flag | u(1) |
| if( sps_extension_present_flag ) { | |
|   sps_range_extension_flag | u(1) |
|   sps_multilayer_extension_flag | u(1) |
|   sps_3d_extension_flag | u(1) |
|   sps_scc_extension_flag | u(1) |
|   sps_extension_4bits | u(4) |
| } | |
| if( sps_range_extension_flag ) | |
|   sps_range_extension( ) | |

| seq_parameter_set_rbsp( ) { | Descriptor |
|---|---|
| if( sps_multilayer_extension_flag )<br>  sps_multilayer_extension( ) /* specified in Annex F */<br>if( sps_3d_extension_flag )<br>  sps_3d_extension( ) /* specified in Annex I*/<br>if( sps_scc_extension_flag )<br>  sps_scc_extension( )<br>if( sps_extension_4bits )<br>  while( more_rbsp_data( ) )<br>    sps_extension_data_flag<br>  rbsp_trailing_bits( )<br>} | <br><br><br><br><br><br><br><br>u(1)<br> |

In accordance with the third example implementation of the fourth aspect of this disclosure, in one example, video encoder 20 may include an intra slice offset syntax element (e.g., intra_slice_tc_offset_div2) and an inter slice offset syntax element in a parameter set (e.g., a SPS, PPS) included in a bitstream that comprises an encoded representation of the video data. Additionally, in this example, video encoder 20 may set a default offset value (e.g., default_tc_offset). Video encoder 20 sets the default offset value to a value of the intra slice offset syntax element when an ALF is enabled and a current slice is an I slice. Video encoder 20 sets the default offset value to a value of the inter slice offset syntax element when the current slice is a P or B slice. Furthermore, video encoder 20 may determine, based on the default offset value, deblocking filter parameters (e.g., as shown in either version of equation 8-352 shown above, Table 8-12, equation 8-353). Video encoder 20 may also determine, based on the deblocking filter parameters, a deblocking filter. Video encoder 20 may apply the determined deblocking filter to samples of the current slice. In some instances, video encoder 20 may determine the deblocking filter and apply the determined deblocking filter in the manner described in sections above labeled, "Filter on/off decision of 4 lines," "strong/weak filter selection for 4 lines," "strong filtering," "weak filtering," and "Chroma filtering." In other examples, video encoder 20 may determine and apply the deblocking filter in other ways.

Similarly, in accordance with the third example implementation of the fourth aspect of this disclosure, in one example, video decoder 30 obtains from a parameter set (e.g., a SPS, PPS) included in a bitstream that comprises an encoded representation of the video data, an intra slice offset syntax element (e.g., intra_slice_tc_offset_div2) and an inter slice offset syntax element (e.g., inter_slice_tc_offset_div2). Additionally, in this example, video decoder 30 may set a default offset value. Video decoder 30 sets the default offset value to a value of the intra slice offset syntax element when an ALF is enabled and a current slice is an I slice. Video decoder 30 sets the default offset value to a value of the inter slice offset syntax element when the current slice is a P or B slice. Video decoder 30 may determine, based on the default offset value, deblocking filter parameters (e.g., as shown in either version of equation 8-352 shown above, Table 8-12, equation 8-353). Furthermore, in this example, video decoder 30 may determine, based on the deblocking filter parameters, a deblocking filter. Video decoder 30 may apply the determined deblocking filter to samples of the current slice. In some instances, video decoder 30 may determine the deblocking filter and apply the determined deblocking filter in the manner described in sections above labeled, "Filter on/off decision of 4 lines," "strong/weak filter selection for 4 lines," "strong filtering," "weak filtering," and "Chroma filtering." In other examples, video decoder 30 may determine and apply the deblocking filter in other ways.

Figure 14:
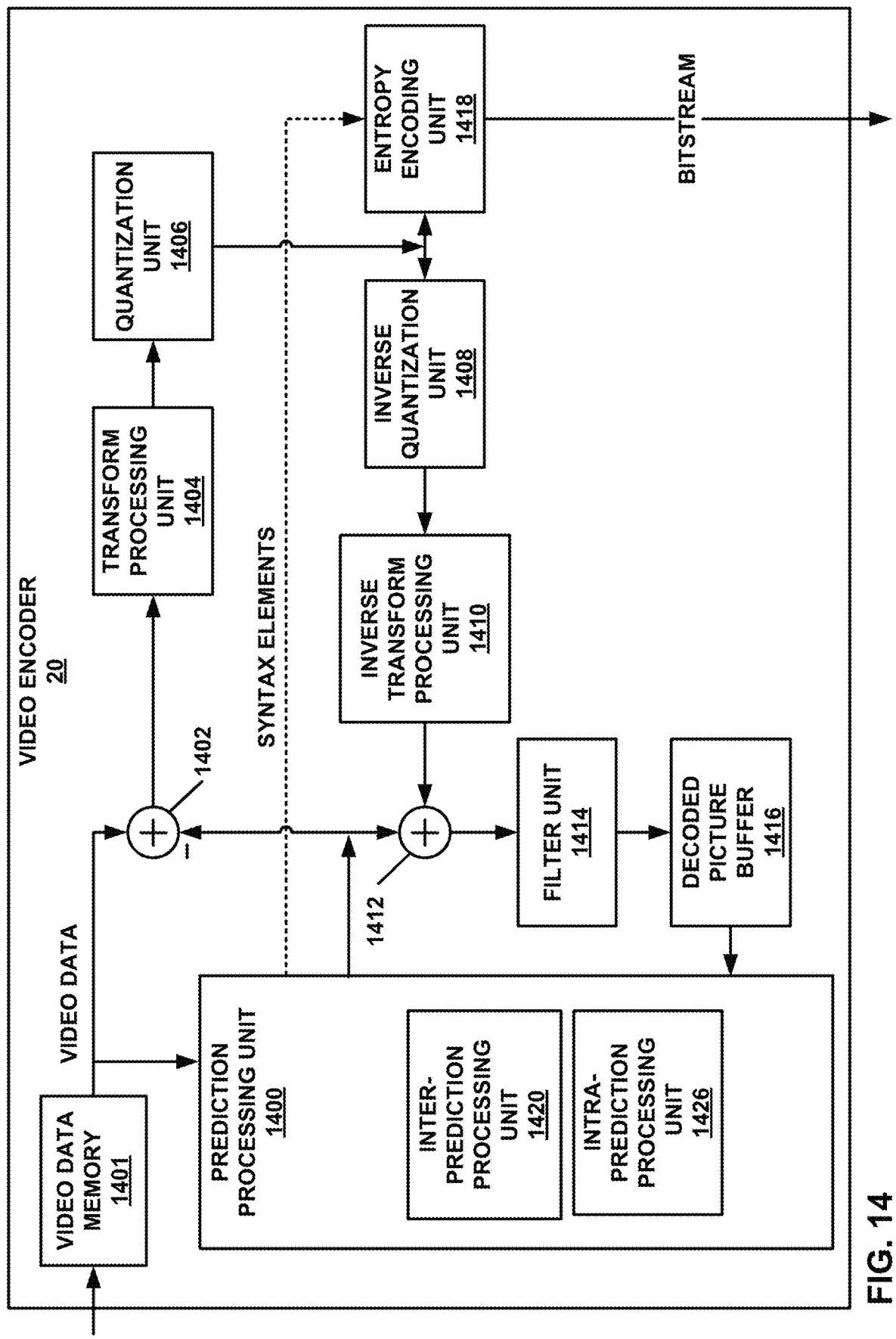
FIG. 14 is a block diagram illustrating an example video encoder that may implement one or more techniques described in this disclosure.

FIG. 14 is a block diagram illustrating an example video encoder 20 that may implement the techniques of this disclosure. FIG. 14 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 14 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 14 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 14, video encoder 20 includes a prediction processing unit 1400, video data memory 1401, a residual generation unit 1402, a transform processing unit 1404, a quantization unit 1406, an inverse quantization unit 1408, an inverse transform processing unit 1410, a reconstruction unit 1412, a filter unit 1414, a decoded picture buffer 1416, and an entropy encoding unit 1418. Prediction processing unit 1400 includes an inter-prediction processing unit 1420 and an intra-prediction processing unit 1426. Inter-prediction processing unit 1420 may include a motion estimation unit and a motion compensation unit (not shown).

Video data memory 1401 may be configured to store video data to be encoded by the components of video encoder 20. The video data stored in video data memory 1401 may be obtained, for example, from video source 18 (FIG. 1). Decoded picture buffer 1416 may be a reference picture memory that stores reference video data for use in encoding video data by video encoder 20, e.g., in intra- or inter-coding modes. Video data memory 1401 and decoded picture buffer 1416 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 1401 and decoded picture buffer 1416 may be provided by the same memory device or separate memory devices. In various examples, video data memory 1401 may be on-chip with other components of video encoder 20, or off-chip relative to those components. Video data memory 1401 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 1400 may perform partitioning to divide the CTBs of the CTU into progressively-smaller blocks. The smaller blocks may be coding blocks of CUs. For example, prediction processing unit 1400 may partition a CTB associated with a CTU according to a tree structure.

Video encoder 20 may encode CUs of a CTU to generate encoded representations of the CUs (i.e., coded CUs). As part of encoding a CU, prediction processing unit 1400 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 1420 may generate predictive data for a PU. As part of generating the predictive data for a PU, inter-prediction processing unit 1420 performs inter prediction on the PU. The predictive data for the PU may include predictive blocks of the PU and motion information for the PU. Inter-prediction processing unit 1420 may perform different operations for a PU of a CU depending on whether the PU is in an I slice, a P slice, or a B slice. In an I slice, all PUs are intra predicted. Hence, if the PU is in an I slice, inter-prediction processing unit 1420 does not perform inter prediction on the PU. Thus, for blocks encoded in I-mode, the predicted block is formed using spatial prediction from previously-encoded neighboring blocks within the same frame. If a PU is in a P slice, inter-prediction processing unit 1420 may use uni-directional inter prediction to generate a predictive block of the PU. If a PU is in a B slice, inter-prediction processing unit 1420 may use uni-directional or bi-directional inter prediction to generate a predictive block of the PU.

Intra-prediction processing unit 1426 may generate predictive data for a PU by performing intra prediction on the PU. The predictive data for the PU may include predictive blocks of the PU and various syntax elements. Intra-prediction processing unit 1426 may perform intra prediction on PUs in I slices, P slices, and B slices.

To perform intra prediction on a PU, intra-prediction processing unit 1426 may use multiple intra prediction modes to generate multiple sets of predictive data for the PU. Intra-prediction processing unit 1426 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 1426 may use various numbers of intra prediction modes, e.g., 33 directional intra prediction modes. In some examples, the number of intra prediction modes may depend on the size of the region associated with the PU.

Prediction processing unit 1400 may select the predictive data for PUs of a CU from among the predictive data generated by inter-prediction processing unit 1420 for the PUs or the predictive data generated by intra-prediction processing unit 1426 for the PUs. In some examples, prediction processing unit 1400 selects the predictive data for the PUs of the CU based on rate/distortion metrics of the sets of predictive data. The predictive blocks of the selected predictive data may be referred to herein as the selected predictive blocks.

Residual generation unit 1402 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 1402 may generate the residual blocks of the CU such that each sample in the residual blocks has a value equal to a difference between a sample in a coding block of the CU and a corresponding sample in a corresponding selected predictive block of a PU of the CU.

Transform processing unit 1404 may perform partition the residual blocks of a CU into transform blocks of Tus of the CU. For instance, transform processing unit 1404 may perform quad-tree partitioning to partition the residual blocks of the CU into transform blocks of Tus of the CU. Thus, a TU may be associated with a luma transform block and two chroma transform blocks. The sizes and positions of the luma and chroma transform blocks of Tus of a CU may or may not be based on the sizes and positions of prediction blocks of the PUs of the CU. A quad-tree structure known as a "residual quad-tree" (RQT) may include nodes associated with each of the regions. The Tus of a CU may correspond to leaf nodes of the RQT.

Transform processing unit 1404 may generate transform coefficient blocks for each TU of a CU by applying one or more transforms to the transform blocks of the TU. Transform processing unit 1404 may apply various transforms to a transform block associated with a TU. For example, transform processing unit 1404 may apply a discrete cosine transform (DCT), a directional transform, or a conceptually similar transform to a transform block. In some examples, transform processing unit 1404 does not apply transforms to a transform block. In such examples, the transform block may be treated as a transform coefficient block.

Quantization unit 1406 may quantize the transform coefficients in a coefficient block. Quantization unit 1406 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Quantization may introduce loss of information. Thus, quantized transform coefficients may have lower precision than the original ones.

Inverse quantization unit 1408 and inverse transform processing unit 1410 may apply inverse quantization and inverse transforms to a coefficient block, respectively, to reconstruct a residual block from the coefficient block. Reconstruction unit 1412 may add the reconstructed residual block to corresponding samples from one or more predictive blocks generated by prediction processing unit 1400 to produce a reconstructed transform block associated with a TU. By reconstructing transform blocks for each TU of a CU in this way, video encoder 20 may reconstruct the coding blocks of the CU.

Filter unit 1414 may perform one or more deblocking operations to reduce blocking artifacts in the coding blocks associated with a CU. Filter unit 1414 may perform filtering techniques described elsewhere in this disclosure. Decoded picture buffer 1416 may store the reconstructed coding blocks after filter unit 1414 performs the one or more deblocking operations on the reconstructed coding blocks. Inter-prediction processing unit 1420 may use a reference picture that contains the reconstructed coding blocks to perform inter prediction on PUs of other pictures. In addition, intra-prediction processing unit 1426 may use reconstructed coding blocks in decoded picture buffer 1416 to perform intra prediction on other PUs in the same picture as the CU.

Entropy encoding unit 1418 may receive data from other functional components of video encoder 20. For example, entropy encoding unit 1418 may receive coefficient blocks from quantization unit 1406 and may receive syntax elements from prediction processing unit 1400. Entropy encoding unit 1418 may perform one or more entropy encoding operations on the data to generate entropy-encoded data. For example, entropy encoding unit 1418 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 1418. For instance, the bitstream may include data that represents values of transform coefficients for a CU.

In one example of the sixth aspect of this disclosure, reconstruction unit 1412 reconstructs pixels of a current block. Furthermore, filter unit 1414 may apply a deblocking filter to the reconstructed pixels of the current block to derive deblocking-filtered reconstructed pixels of the current block. Subsequently, prediction processing unit 1400 may calculate distortion values based on values of the deblocking-filtered reconstructed pixels of the current block and original pixels of the current block (e.g., the difference of such values). Prediction processing unit 1400 may then select, based on the calculated distortion values, an encoding mode for the current block, the encoding mode for the current block being a partitioning mode or a CU mode for the current block.

Figure 15:
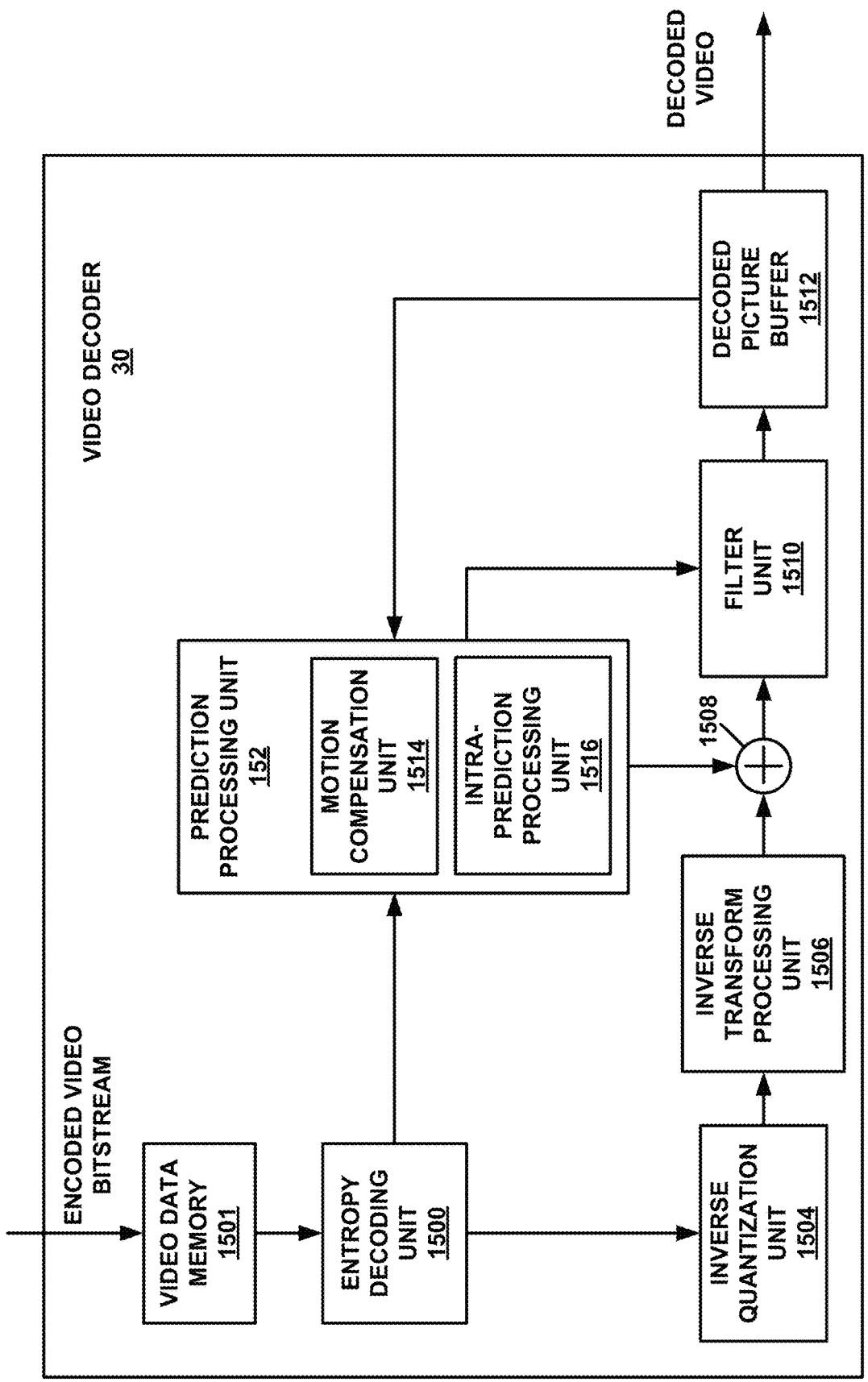
FIG. 15 is a block diagram illustrating an example video decoder that may implement one or more techniques described in this disclosure.

FIG. 15 is a block diagram illustrating an example video decoder 30 that is configured to implement the techniques of this disclosure. FIG. 15 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 15 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 15 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 15, video decoder 30 includes an entropy decoding unit 1500, video data memory 1501, a prediction processing unit 1502, an inverse quantization unit 1504, an inverse transform processing unit 1506, a reconstruction unit 1508, a filter unit 1510, and a decoded picture buffer 1512. Prediction processing unit 1502 includes a motion compensation unit 1514 and an intra-prediction processing unit 1516. In other examples, video decoder 30 may include more, fewer, or different functional components.

Video data memory 1501 may store encoded video data, such as an encoded video bitstream, to be decoded by the components of video decoder 30. The video data stored in video data memory 1501 may be obtained, for example, from computer-readable medium 16, e.g., from a local video source, such as a camera, via wired or wireless network communication of video data, or by accessing physical data storage media. Video data memory 1501 may form a coded picture buffer (CPB) that stores encoded video data from an encoded video bitstream. Decoded picture buffer 1512 may be a reference picture memory that stores reference video data for use in decoding video data by video decoder 30, e.g., in intra- or inter-coding modes, or for output. Video data memory 1501 and decoded picture buffer 1512 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 1501 and decoded picture buffer 1512 may be provided by the same memory device or separate memory devices. In various examples, video data memory 1501 may be on-chip with other components of video decoder 30, or off-chip relative to those components. Video data memory 1501 may be the same as or part of storage media 28 of FIG. 1.

Video data memory 1501 receives and stores encoded video data (e.g., NAL units) of a bitstream. Entropy decoding unit 1500 may receive encoded video data (e.g., NAL units) from video data memory 1501 and may parse the NAL units to obtain syntax elements. Entropy decoding unit 1500 may entropy decode entropy-encoded syntax elements in the NAL units. Prediction processing unit 1502, inverse quantization unit 1504, inverse transform processing unit 1506, reconstruction unit 1508, and filter unit 1510 may generate decoded video data based on the syntax elements extracted from the bitstream. Entropy decoding unit 1500 may perform a process generally reciprocal to that of entropy encoding unit 1418.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 1504 may inverse quantize, i.e., de-quantize, coefficient blocks associated with the TU. After inverse quantization unit 1504 inverse quantizes a coefficient block, inverse transform processing unit 1506 may apply one or more inverse transforms to the coefficient block in order to generate a residual block associated with the TU. For example, inverse transform processing unit 1506 may apply an inverse DCT, an inverse integer transform, an inverse Karhunen-Loeve transform (KLT), an inverse rotational transform, an inverse directional transform, or another inverse transform to the coefficient block.

Inverse quantization unit 1504 may perform particular techniques of this disclosure. For example, for at least one respective quantization group of a plurality of quantization groups within a CTB of a CTU of a picture of the video data, inverse quantization unit 1504 may derive, based at least in part on local quantization information signaled in the bitstream, a respective quantization parameter for the respective quantization group. Additionally, in this example, inverse quantization unit 1504 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 1506, reconstruction unit 1508, and filter unit 1510) may reconstruct, based on inverse quantized transform coefficients of the transform block, a coding block of the CU.

If a PU is encoded using intra prediction, intra-prediction processing unit 1516 may perform intra prediction to generate predictive blocks of the PU. Intra-prediction processing unit 1516 may use an intra prediction mode to generate the predictive blocks of the PU based on samples spatially-neighboring blocks. Intra-prediction processing unit 1516 may determine the intra prediction mode for the PU based on one or more syntax elements obtained from the bitstream.

If a PU is encoded using inter prediction, entropy decoding unit 1500 may determine motion information for the PU. Motion compensation unit 1514 may determine, based on the motion information of the PU, one or more reference blocks. Motion compensation unit 1514 may generate, based on the one or more reference blocks, predictive blocks (e.g., predictive luma, Cb and Cr blocks) for the PU.

Reconstruction unit 1508 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 1508 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 1510 may perform a deblocking operation to reduce blocking artifacts associated with the coding blocks of the CU. Filter unit 1510 may perform filtering techniques described elsewhere in this disclosure. Video decoder 30 may store the coding blocks of the CU in decoded picture buffer 1512. Decoded picture buffer 1512 may provide reference pictures for subsequent motion compensation, intra prediction, and presentation on a display device, such as display device 32 of FIG. 1. For instance, video decoder 30 may perform, based on the blocks in decoded picture buffer 1512, intra prediction or inter prediction operations for PUs of other CUs.

Figure 16:
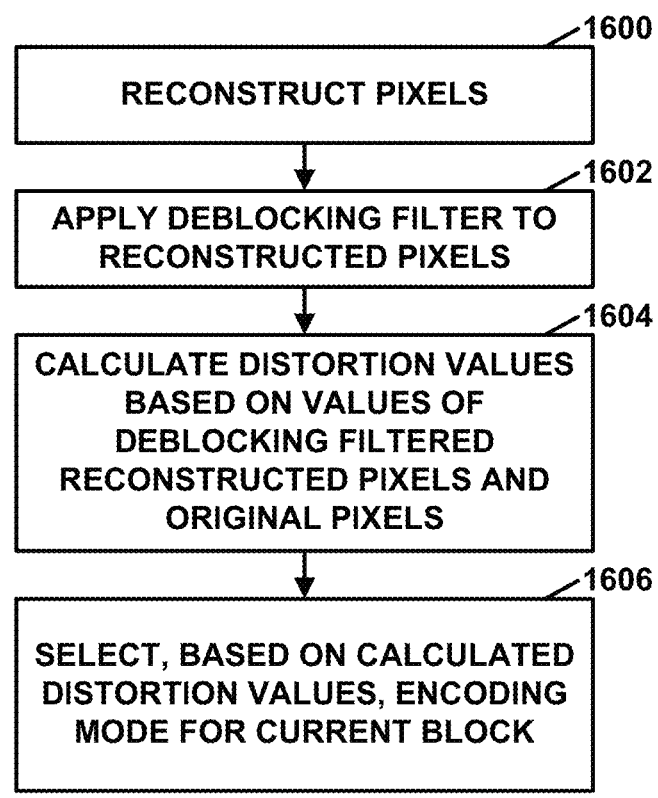
FIG. 16 is a flowchart illustrating an example operation of a video encoder, in accordance with a technique of this disclosure.

FIG. 16 is a flowchart illustrating an example operation of video encoder 20, in accordance with a technique of this disclosure. In the example of FIG. 16, video encoder 20 may reconstruct pixels of a current block (1600). For example, video encoder 20 may reconstruct pixels in coding blocks of a CU. In some examples, video encoder 20 may reconstruct a plurality of different sets of pixels for the current block. Each different set of pixels is a decoded version of the current block encoded according to a different partitioning mode and/or a CU mode.

Furthermore, in the example of FIG. 16, video encoder 20 may apply a deblocking filter to the reconstructed pixels of the current block to derive deblocking-filtered reconstructed pixels (1602). Video encoder 20 may apply the deblocking filter in accordance with any of the examples provided elsewhere in this disclosure. For instance, video encoder 20 may apply the deblocking filter along directional and/or non-directional edges, as described elsewhere in this disclosure.

In accordance with one or more techniques of this disclosure, video encoder 20 calculates distortion values based on values of the deblocking-filtered reconstructed pixels of the current block and original pixels of the current block (1604). A distortion value is a measure of how different the deblocking-filtered reconstructed pixels of the current block are from the original pixels of the current block. By calculating the distortion values based on values of the deblocking-filtered reconstructed pixels of the current block instead of simply the reconstructed pixels of the current block (i.e., non-deblocking filtered reconstructed pixels of the current block), video encoder 20 may be able to determine the distortion values more accurately. Determining the distortion values more accurately may increase the likelihood of video encoder 20 selecting an optimal partitioning mode and/or CU mode for the current block. In some examples, video encoder 20 may calculate the distortion values comprises calculating the distortion values based on the values of the original pixels and only those ones of the deblocking-filtered reconstructed pixels that are within the current block (e.g., based on the difference of the original pixels and only those ones of the deblocking-filtered reconstructed pixels that are within the current block).

Thus, in the example of FIG. 16, video encoder 20 selects, based on the calculated distortion values, an encoding mode for the current block (1606). The encoding mode may be a partitioning mode for the current block or a CU mode for the current block. In some examples, video encoder 20 uses the calculated distortion values to determine rate-distortion costs for different combinations of partitioning modes and CU modes. In such examples, video encoder 20 may select the combination having the lowest rate-distortion cost. Video encoder 20 may include, in a bitstream, a representation of the current block encoded according to the selected encoding mode for the current block. In some instances, the partitioning mode is one of: quad-tree based splitting, binary-tree based splitting, or no further splitting. In some instances, the partitioning mode may include symmetric splitting, asymmetric splitting, or no further splitting.

In one example, for each respective partitioning mode of a plurality of partitioning modes, video encoder 20 may generate an encoded version of the current block according to the respective partitioning mode. In some instances, the plurality of partitioning modes may include quad-tree based splitting, binary-tree based splitting, and no further splitting. In some instances, the plurality of partitioning modes may include symmetric splitting, asymmetric splitting, and no further splitting. Additionally, in this example, video encoder 20 may reconstruct pixels for the respective partitioning mode based on the encoded version of the current block according to the respective partitioning mode. For instance, inverse quantization unit 1408, inverse transform processing unit 1410, and reconstruction unit 1412 of video encoder 20 may reconstruct the pixels, as described elsewhere in this disclosure. Furthermore, in this example, video encoder 20 (e.g., filter unit 1414 of video encoder 20) may apply the deblocking filter to the reconstructed pixels for the respective partitioning mode to derive deblocking-filtered reconstructed pixels for the respective partitioning mode. In this example, video encoder 20 may calculate a distortion value for the respective partitioning mode based on the original pixels of the current and the deblocking-filtered reconstructed pixels for the respective partitioning mode. Furthermore, in this example, as part of selecting the encoding mode for the current block, video encoder 20 may select, based on the distortion values for the partitioning modes in the plurality of partitioning modes, the partitioning mode for the current block from among the plurality of partitioning modes. For instance, video encoder 20 may determine rate-distortion costs for the partitioning modes based on the distortion values and select the partitioning mode with the lowest rate-distortion cost.

In one example, for each respective CU mode of the plurality of CU modes (e.g., intra prediction and inter prediction), video encoder 20 may generate an encoded version of the current block according to the respective CU mode. For instance, video encoder 20 may generate an intra predicted version of the current block and an inter predicted version of the current block, as described elsewhere in this disclosure. Furthermore, in this example, video encoder 20 may reconstruct pixels for the respective CU mode based on the encoded version of the current block according to the respective CU mode. For instance, inverse quantization unit 1408, inverse transform processing unit 1410, and reconstruction unit 1412 of video encoder 20 may reconstruct the pixels, as described elsewhere in this disclosure. Furthermore, in this example, video encoder 20 (e.g., filter unit 1414 of video encoder 20) may apply the deblocking filter to the reconstructed pixels for the respective CU mode to derive deblocking-filtered reconstructed pixels for the respective CU mode. In this example, video encoder 20 may calculate a distortion value for the respective partitioning mode based on the original pixels of the current and the deblocking-filtered reconstructed pixels for the respective CU mode. Furthermore, in this example, as part of selecting the encoding mode for the current block, video encoder 20 may select, based on the distortion values for the CU modes in the plurality of CU modes, the CU mode for the current block from among the plurality of CU modes. For instance, video encoder 20 may determine rate-distortion costs for the CU modes based on the distortion values and select the CU mode with the lowest rate-distortion cost.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
reconstructing pixels of a current block of a current picture of video data;
applying a deblocking filter to the reconstructed pixels of the current block of the current picture to derive deblocking-filtered reconstructed pixels of the current block of the current picture;
calculating distortion values based on values of the deblocking-filtered reconstructed pixels of the current block of the current picture and original pixels of the current block of the current picture; and
selecting, based on the calculated distortion values, an encoding mode for the current block of the current picture, the encoding mode for the current block of the current picture being a partitioning mode for the current block of the current picture or a coding unit mode for the current block of the current picture.

2. The method of claim 1, wherein calculating the distortion values comprises calculating the distortion values based on the values of the original pixels and only those ones of the deblocking-filtered reconstructed pixels that are within the current block.

3. The method of claim 1, wherein:
the reconstructed pixels are a first set of reconstructed pixels and the deblocking-filtered reconstructed pixels are a first set of deblocking-filtered reconstructed pixels,
and wherein the method further comprises:
for each respective partitioning mode of a plurality of partitioning modes:
generating an encoded version of the current block according to the respective partitioning mode;
reconstructing pixels for the respective partitioning mode based on the encoded version of the current block according to the respective partitioning mode;
applying the deblocking filter to the reconstructed pixels for the respective partitioning mode to derive deblocking-filtered reconstructed pixels for the respective partitioning mode; and
calculating a distortion value for the respective partitioning mode based on the original pixels of the current and the deblocking-filtered reconstructed pixels for the respective partitioning mode, and
selecting the encoding mode for the current block comprises selecting, based on the distortion values for the partitioning modes in the plurality of partitioning modes, the partitioning mode for the current block from among the plurality of partitioning modes.

4. The method of claim 1, wherein:
the reconstructed pixels are a first set of reconstructed pixels and the deblocking-filtered reconstructed pixels are a first set of deblocking-filtered reconstructed pixels,
and wherein the method further comprises:
for each respective coding unit mode of the plurality of coding unit modes:
generating an encoded version of the current block according to the respective coding unit mode;
reconstructing pixels for the respective coding unit mode based on the encoded version of the current block according to the respective coding unit mode;
applying the deblocking filter to the reconstructed pixels for the respective coding unit mode to derive deblocking-filtered reconstructed pixels for the respective coding unit mode; and calculating a distortion value for the respective coding unit mode based on the original pixels of the current and the deblocking-filtered reconstructed pixels for the respective coding unit mode, and selecting the encoding mode for the current block comprises selecting, based on the distortion value for the coding unit modes in the plurality of coding unit modes, the coding unit mode for the current block from among the plurality of coding unit modes.

5. The method of claim 1, further comprising:
including, in a bitstream, a representation of the current block encoded according to the selected encoding mode for the current block.

6. The method of claim 1, wherein the coding unit mode for the current block is either inter prediction or intra prediction.

7. The method of claim 1, wherein the partitioning mode for the current block is one of: quad-tree based splitting, binary-tree based splitting, or no further splitting.

8. The method of claim 1, wherein the partitioning mode for the current block is one of: symmetric splitting, asymmetric splitting, or no further splitting.

9. An apparatus for encoding video data, the apparatus comprising:
one or more storage media configured to store the video data; and
one or more processing circuits coupled to the one or more storage media, the one or more processing circuits configured to:
reconstruct pixels of a current block of a current picture of the video data;
apply a deblocking filter to the reconstructed pixels of the current block of the current picture to derive deblocking-filtered reconstructed pixels of the current block of the current picture;
calculate distortion values based on values of the deblocking-filtered reconstructed pixels of the current block of the current picture and original pixels of the current block of the current picture; and
select, based on the calculated distortion values, an encoding mode for the current block of the current picture, the encoding mode for the current block of the current picture being a partitioning mode for the current block of the current picture or a coding unit mode for the current block of the current picture.

10. The apparatus of claim 9, wherein the one or more processing circuits are configured such that, as part of calculating the distortion values, the one or more processing circuits calculate the distortion values based on the original pixels and only those ones of the deblocking-filtered reconstructed pixels that are within the current block.

11. The apparatus of claim 9, wherein:
the reconstructed pixels are a first set of reconstructed pixels and the deblocking-filtered reconstructed pixels are a first set of deblocking-filtered reconstructed pixels,
wherein the one or more processing circuits are further configured to:
for each respective partitioning mode of a plurality of partitioning modes:
generate an encoded version of the current block according to the respective partitioning mode;
reconstruct pixels for the respective partitioning mode based on the encoded version of the current block according to the respective partitioning mode;
apply the deblocking filter to the reconstructed pixels for the respective partitioning mode to derive deblocking-filtered reconstructed pixels for the respective partitioning mode; and
calculate a distortion value for the respective partitioning mode based on the original pixels of the current and the deblocking-filtered reconstructed pixels for the respective partitioning mode, and
wherein the one or more processing circuits are configured such that, as part of selecting the encoding mode for the current block, the one or more processing circuits select, based on the distortion values for the partitioning modes in the plurality of partitioning modes, the partitioning mode for the current block from among the plurality of partitioning modes.

12. The apparatus of claim 9, wherein:
the reconstructed pixels are a first set of reconstructed pixels and the deblocking-filtered reconstructed pixels are a first set of deblocking-filtered reconstructed pixels,
and wherein the one or more processing circuits are further configured to:
for each respective coding unit mode of the plurality of coding unit modes:
generate an encoded version of the current block according to the respective coding unit mode;
reconstruct pixels for the respective coding unit mode based on the encoded version of the current block according to the respective coding unit mode;
apply the deblocking filter to the reconstructed pixels for the respective coding unit mode to derive deblocking-filtered reconstructed pixels for the respective coding unit mode; and
calculate a distortion value for the respective coding unit mode based on the original pixels of the current and the deblocking-filtered reconstructed pixels for the respective coding unit mode, and
wherein the one or more processing circuits are configured such that, as part of selecting the encoding mode for the current block, the one or more processing circuits select, based on the distortion values for the coding unit modes in the plurality of coding unit modes, the coding unit mode for the current block from among the plurality of coding unit modes.

13. The apparatus of claim 9, wherein the one or more processors are further configured to:
include, in a bitstream, a representation of the current block encoded according to the selected encoding mode for the current block.

14. The apparatus of claim 9, wherein the coding unit mode for the current block is either inter prediction or intra prediction.

15. The apparatus of claim 9, wherein the partitioning mode for the current block is one of: quad-tree based splitting, binary-tree based splitting, or no further splitting.

16. The apparatus of claim 9, wherein the partitioning mode for the current block is one of: symmetric splitting, asymmetric splitting, or no further splitting.

17. The apparatus of claim 9, wherein the apparatus comprises:
an integrated circuit,
a microprocessor, or
a wireless communication device.

18. An apparatus for encoding video data, the apparatus comprising:
means for reconstructing pixels of a current block of a current picture of video data;
means for applying a deblocking filter to the reconstructed pixels of the current block of the current picture to derive deblocking-filtered reconstructed pixels of the current block of the current picture;
means for calculating distortion values based on values of the deblocking-filtered reconstructed pixels of the current block of the current picture and original pixels of the current block of the current picture; and
means for selecting, based on the calculated distortion values, an encoding mode for the current block of the current picture, the encoding mode for the current block of the current picture being a partitioning mode for the current block of the current picture or a coding unit mode for the current block of the current picture.

19. The apparatus of claim 18, wherein the means for calculating the distortion values comprises means for calculating the distortion values based on the values of the original pixels and only those ones of the deblocking-filtered reconstructed pixels that are within the current block.

20. The apparatus of claim 18, wherein:
the reconstructed pixels are a first set of reconstructed pixels and the deblocking-filtered reconstructed pixels are a first set of deblocking-filtered reconstructed pixels,
and wherein the apparatus further comprises:
for each respective partitioning mode of a plurality of partitioning modes:
means for generating an encoded version of the current block according to the respective partitioning mode;
means for reconstructing pixels for the respective partitioning mode based on the encoded version of the current block according to the respective partitioning mode;
means for applying the deblocking filter to the reconstructed pixels for the respective partitioning mode to derive deblocking-filtered reconstructed pixels for the respective partitioning mode; and
means for calculating a distortion value for the respective partitioning mode based on the original pixels of the current and the deblocking-filtered reconstructed pixels for the respective partitioning mode, and
wherein the means for selecting the encoding mode for the current block comprises means for selecting, based on the distortion values for the partitioning modes in the plurality of partitioning modes, the partitioning mode for the current block from among the plurality of partitioning modes.

21. The apparatus of claim 18, wherein:
the reconstructed pixels are a first set of reconstructed pixels and the deblocking-filtered reconstructed pixels are a first set of deblocking-filtered reconstructed pixels,
and wherein the apparatus further comprises:
for each respective coding unit mode of the plurality of coding unit modes:
means for generating an encoded version of the current block according to the respective coding unit mode;
means for reconstructing pixels for the respective coding unit mode based on the encoded version of the current block according to the respective coding unit mode;
means for applying the deblocking filter to the reconstructed pixels for the respective coding unit mode to derive deblocking-filtered reconstructed pixels for the respective coding unit mode; and
means for calculating a distortion value for the respective coding unit mode based on the original pixels of the current and the deblocking-filtered reconstructed pixels for the respective coding unit mode, and
wherein the means for selecting the encoding mode for the current block comprises means for selecting, based on the distortion values for the coding unit modes in the plurality of coding unit modes, the coding unit mode for the current block from among the plurality of coding unit modes.

22. The apparatus of claim 18, further comprising:
means for including, in a bitstream, a representation of the current block encoded according to the selected encoding mode for the current block.

23. The apparatus of claim 18, wherein the coding unit mode for the current block is either inter prediction or intra prediction.

24. A non-transitory computer-readable storage medium storing instructions that, when executed, cause one or more processors to:
reconstruct pixels of a current block of a current picture of video data;
apply a deblocking filter to the reconstructed pixels of the current block of the current picture to derive deblocking-filtered reconstructed pixels of the current block of the current picture;
calculate distortion values based on values of the deblocking-filtered reconstructed pixels of the current block of the current picture and original pixels of the current block of the current picture; and
select, based on the calculated distortion values, an encoding mode for the current block of the current picture, the encoding mode for the current block of the current picture being a partitioning mode for the current block of the current picture or a coding unit mode for the current block of the current picture.

25. The non-transitory computer-readable storage medium of claim 24, wherein as part of causing the one or more processors to calculate the distortion values, execution of the instructions causes the one or more processors to calculate the distortion values based on the values of the original pixels and only those ones of the deblocking-filtered reconstructed pixels that are within the current block.

26. The non-transitory computer-readable storage medium of claim 24, wherein:
the reconstructed pixels are a first set of reconstructed pixels and the deblocking-filtered reconstructed pixels are a first set of deblocking-filtered reconstructed pixels,
and wherein execution of the instructions further causes the one or more processors to:
for each respective partitioning mode of a plurality of partitioning modes:
generate an encoded version of the current block according to the respective partitioning mode;

reconstruct pixels for the respective partitioning mode based on the encoded version of the current block according to the respective partitioning mode;

apply the deblocking filter to the reconstructed pixels for the respective partitioning mode to derive deblocking-filtered reconstructed pixels for the respective partitioning mode; and calculate a distortion value for the respective partitioning mode based on the original pixels of the current and the deblocking-filtered reconstructed pixels for the respective partitioning mode, and as part of causing the one or more processors to select the encoding mode for the current block, execution of the instructions causes the one or more processors to select, based on the distortion values for the partitioning modes in the plurality of partitioning modes, the partitioning mode for the current block from among the plurality of partitioning modes.

27. The non-transitory computer-readable storage medium of claim 24, wherein:

the reconstructed pixels are a first set of reconstructed pixels and the deblocking-filtered reconstructed pixels are a first set of deblocking-filtered reconstructed pixels, and wherein execution of the instructions further causes the one or more processors to:

for each respective coding unit mode of the plurality of coding unit modes:

generate an encoded version of the current block according to the respective coding unit mode;

reconstruct pixels for the respective coding unit mode based on the encoded version of the current block according to the respective coding unit mode;

apply the deblocking filter to the reconstructed pixels for the respective coding unit mode to derive deblocking-filtered reconstructed pixels for the respective coding unit mode; and calculate a distortion value for the respective coding unit mode based on the original pixels of the current and the deblocking-filtered reconstructed pixels for the respective coding unit mode, and as part of causing the one or more processors to select the encoding mode for the current block, execution of the instructions causes the one or more processors to select, based on the distortion values for the coding unit modes in the plurality of coding unit modes, the coding unit mode for the current block from among the plurality of coding unit modes.

28. The non-transitory computer-readable storage medium of claim 24, wherein execution of the instructions further causes the one or more processors to:

include, in a bitstream, a representation of the current block encoded according to the selected encoding mode for the current block.

29. The non-transitory computer-readable storage medium of claim 24, wherein the coding unit mode for the current block is either inter prediction or intra prediction.

* * * * *